(12) United States Patent
Ryan et al.

(10) Patent No.: US 7,092,963 B2
(45) Date of Patent: Aug. 15, 2006

(54) DATABASE METHOD AND STRUCTURE FOR A FINISHING SYSTEM

(75) Inventors: Donald R. Ryan, Webster, NY (US); Henry T. Kremers, Fairport, NY (US); Kevin R. Mathers, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 270 days.

(21) Appl. No.: 09/858,438

(22) Filed: May 16, 2001

(65) Prior Publication Data

US 2002/0078012 A1 Jun. 20, 2002

Related U.S. Application Data

(60) Provisional application No. 60/204,720, filed on May 16, 2000, provisional application No. 60/204,716, filed on May 16, 2000, provisional application No. 60/204,460, filed on May 16, 2000, provisional application No. 60/204,471, filed on May 16, 2000, provisional application No. 60/204,624, filed on May 16, 2000.

(51) Int. Cl.
*G06F 17/00* (2006.01)
*G06F 7/00* (2006.01)
*G03G 15/00* (2006.01)

(52) U.S. Cl. .................... 707/104.1; 707/102; 399/361

(58) Field of Classification Search ............. 707/104.1, 707/102, 103 R; 358/1.7–1.18; 399/42–43, 399/75–78, 361, 397, 407–411
See application file for complete search history.

(56) References Cited

U.S. PATENT DOCUMENTS

| 4,539,653 | A | * | 9/1985 | Bartlett et al. .............. 715/520 |
| 5,095,369 | A | * | 3/1992 | Ortiz et al. .................. 358/296 |
| 5,129,639 | A | * | 7/1992 | DeHority .................... 270/1.01 |
| 5,170,340 | A | * | 12/1992 | Prokop et al. ................ 700/23 |
| 5,181,162 | A | * | 1/1993 | Smith et al. ................ 715/530 |
| 5,283,752 | A | * | 2/1994 | Gombault et al. .......... 700/221 |
| 5,461,469 | A | * | 10/1995 | Farrell et al. ................ 399/407 |
| 5,546,577 | A | * | 8/1996 | Marlin et al. ........... 707/103 R |
| 5,579,087 | A | * | 11/1996 | Salgado ........................ 399/1 |
| 5,628,249 | A | * | 5/1997 | Cordery et al. ............... 101/91 |
| 5,680,615 | A | * | 10/1997 | Marlin et al. ........... 707/103 R |
| 5,715,381 | A | * | 2/1998 | Hamilton .................... 358/1.15 |
| 5,727,220 | A | * | 3/1998 | Hohensee et al. .......... 715/513 |
| 5,758,074 | A | * | 5/1998 | Marlin et al. ............... 709/250 |
| 5,761,396 | A | * | 6/1998 | Austin et al. .............. 358/1.15 |
| 5,778,377 | A | * | 7/1998 | Marlin et al. ........... 707/103 R |
| 5,790,119 | A | * | 8/1998 | Sklut et al. .................. 345/839 |
| 5,872,569 | A | * | 2/1999 | Salgado et al. ............. 345/764 |

(Continued)

FOREIGN PATENT DOCUMENTS

EP 0-851365 A1 * 1/1998

(Continued)

OTHER PUBLICATIONS

DMTF "Desktop Management Interface Specification, Version 1.0", Apr. 29, 1994.*

(Continued)

*Primary Examiner*—Luke S Wassum
(74) *Attorney, Agent, or Firm*—Fay, Sharpe, Fagan, Minnich & McKee, LLP

(57) ABSTRACT

A method and structure for a virtual finishing job ticket database used in a finishing system wherein the database stores capability and constraint information relating to finishing devices available for a finishing job, receives information describing the finishing operations to be performed, and stores the information in a manner accessible for management of the finishing job.

29 Claims, 20 Drawing Sheets

U.S. PATENT DOCUMENTS

Figure 1:
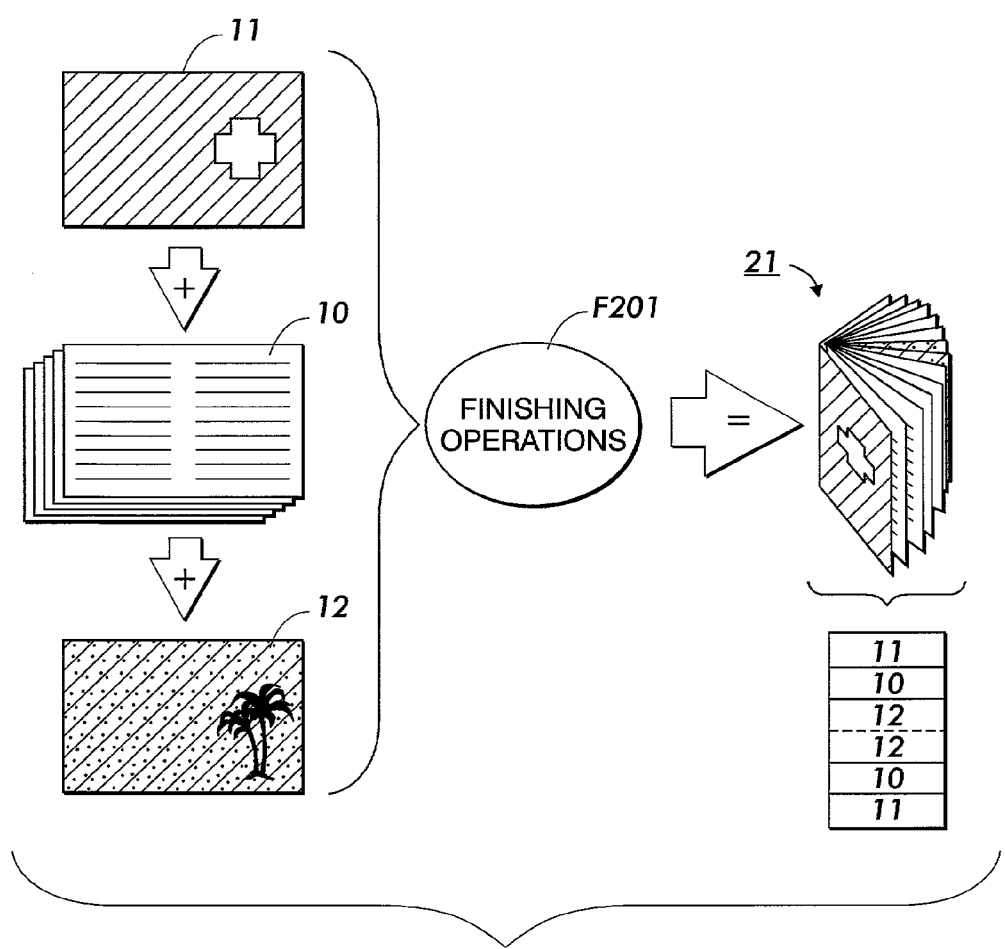

| | | | |
|---|---|---|---|
| 5,995,721 A * | 11/1999 | Rourke et al. | 358/1.15 |
| 6,088,120 A * | 7/2000 | Shibusawa et al. | 358/1.15 |
| 6,181,893 B1 * | 1/2001 | Collard et al. | 399/80 |
| 6,327,050 B1 * | 12/2001 | Motamed et al. | 358/1.18 |
| 6,338,076 B1 * | 1/2002 | Hidding et al. | 715/530 |
| 6,407,820 B1 * | 6/2002 | Hansen et al. | 358/1.12 |
| 6,504,621 B1 * | 1/2003 | Salgado | 358/1.16 |
| 6,549,299 B1 * | 4/2003 | Allen et al. | 358/1.18 |
| 6,559,958 B1 * | 5/2003 | Motamed et al. | 358/1.13 |
| 6,606,165 B1 * | 8/2003 | Barry et al. | 358/1.9 |
| 6,833,925 B1 * | 12/2004 | Igoe et al. | 358/1.15 |
| 6,873,426 B1 * | 3/2005 | Farrell | 358/1.15 |
| 2003/0142332 A1 * | 7/2003 | Endoh et al. | 358/1.11 |
| 2003/0234954 A1 * | 12/2003 | Hohensee et al. | 358/1.15 |
| 2004/0160641 A1 * | 8/2004 | Kohler et al. | 358/1.18 |
| 2004/0168125 A1 * | 8/2004 | van der Meer et al. | 715/523 |
| 2005/0030578 A1 * | 2/2005 | Wiechers | 358/1.15 |
| 2005/0033589 A1 * | 2/2005 | Wiechers | 705/1 |
| 2005/0034022 A1 * | 2/2005 | Wiechers et al. | 714/37 |
| 2005/0034030 A1 * | 2/2005 | Wiechers | 714/44 |
| 2005/0043842 A1 * | 2/2005 | Wiechers | 700/115 |
| 2005/0043843 A1 * | 2/2005 | Wiechers | 700/115 |
| 2005/0043844 A1 * | 2/2005 | Wiechers et al. | 700/115 |
| 2005/0043845 A1 * | 2/2005 | Wiechers | 700/115 |
| 2005/0043846 A1 * | 2/2005 | Wiechers | 700/115 |
| 2005/0043847 A1 * | 2/2005 | Wiechers | 700/115 |
| 2005/0043848 A1 * | 2/2005 | Wiechers | 700/115 |

FOREIGN PATENT DOCUMENTS

| | | | |
|---|---|---|---|
| EP | 1-096781 A2 * | 5/2001 | |
| WO | WO 97/28972 A1 * | 8/1997 | |

OTHER PUBLICATIONS

Marlin et al. "Large Mailing Operations Standards Specification, Version 1.0", produced by the Desktop Management Task Force, Oct. 31, 1994.*

DMTF "Desktop Management Interface Specification, Version 2.0s", Document DSP0001, Jun. 24, 1998.*

Daun, S., G. Lucas and J. Schonhut "Specification of the CIP3 Print Production Format, Version 3.0", Jun. 2, 1998.*

* cited by examiner

JOB SEGMENT IDENTIFIER (JSI)

| | |
|---|---|
| Job Number: | 6543210 |
| Job Segment Identifier Code: | 112233 |
| Job Name: | Example |
| Sub-components: | 1 |
| Sub-component 1 Name: | Cover |
| Finishing Operations: | 3 |
| Finishing Operation 1: | Set Feeder |
| Finishing Operation 2: | SBM |
| Finishing Operation 3: | Fold and Trim |
| Job Quantity: | 30 |
| Job Sheets: | 20 |
| Finished Size: | 8.5 x 5.25 inches |

601

602

603

DATABASE METHOD AND STRUCTURE FOR A FINISHING SYSTEM

Priority is claimed from Provisional Application No. 60/204,720, filed May 16, 2000.

CROSS REFERENCE TO RELATED APPLICATIONS

Reference is made to commonly-assigned now abandoned U.S. Provisional Patent Application Ser. Nos. 60/204,716, filed May 16, 2000, entitled: Finishing Module Coordinator Apparatus and Method for Assembler/Finisher Systems, by Ryan, et al; 60/204,460, filed May 16, 2000, entitled: Production Monitor Controller Apparatus and Method for Assembler/Finisher Systems, by Ryan, et al; 60/204,471, filed May 16, 2000, entitled: Graphic User Interface for Managing Assembler/Finisher Systems, by Ryan, et al; 60/204,624, filed May 16, 2000, refiled Apr. 25, 2001, as U.S. Ser. No. 09/841,089, entitled: Apparatus and Method for Describing, Planning, and Automatically Programming Complex Finishing Tasks, by Ryan et al., the disclosures of which are incorporated herein.

BACKGROUND OF THE INVENTION

It is believed that the present invention is applicable to the electronic management and control of a wide range of finishing processes characterized by input from multiple production operations and equipment that, depending upon the job, may be variably applied to work pieces that themselves are highly variable between different jobs. Although the present invention is explained in relation to printing and finishing operations for printed documents, the present invention may apply to such industries, without limitation, as include textile production (which may include printing, cutting, sewing, and finishing), packaging operations for various consumer and industrial products, printed wiring board production, etc. In particular, the present invention is applicable to many operations where processes for production of work pieces are managed separately from processes for finishing and packaging of such work pieces.

Creation and production of printed documents often involves many production and finishing operations that are highly variable with each job. In general, the various operations can be grouped into three major phases: 1) creation of the document information, including prepress operations that render the document in a form suitable for printing, 2) printing of the information onto some form of media such as paper, and 3) finishing of the selected media into a completed document. These 3 major phases often have many sub-phases, and the entire process may vary from relatively simple to extremely complex. The present invention deals with techniques by which a user may provide detailed instructions for each of the three phases such that instructions may be created as early as during the first phase that are sufficient to guide the entire process through to completion of the third phase. Although of potential use in many printing operations, the present invention is particularly applicable to automated systems for creating, printing, and finishing complex documents within a multi-printer, completely digital environment using digital printers.

Traditionally in phase 1, when a document is composed, the person doing the composition will create one or more electronic image files that represent the parts of the document to be produced. These electronic image data files may be stored in many different formats by many different document creation and manipulation programs. For instance, for a complex document such as a book that utilizes color printing for book covers and pictorial inserts, any of a variety of Page Description Languages (PDLs), such as Postscript® and Postscript-compatible languages, may be used to render the color images in printable form. Often different components within a document will utilize different PDLs. For instance, the cover may be created by a different work team or upon different equipment than photographic reprints or other internal color components. Each prepress team or prepress device may utilize a PDL optimized for its use. For pages comprised of simple monochrome text, a desk-top publishing programs may be utilized to render such pages or a simpler word processing language may be utilized. Still other prepress formats may be utilized for printing of inserts, dividers, and other possible components internal to the finished document. There also may be included in the assembly/finishing job non-printed components such as, without limitation, plastic separators, previously printed sheets retrieved from inventory, photographically produced sheets, or specialized media such as vinyl disk holders or perfume sample packs.

Figure 2:
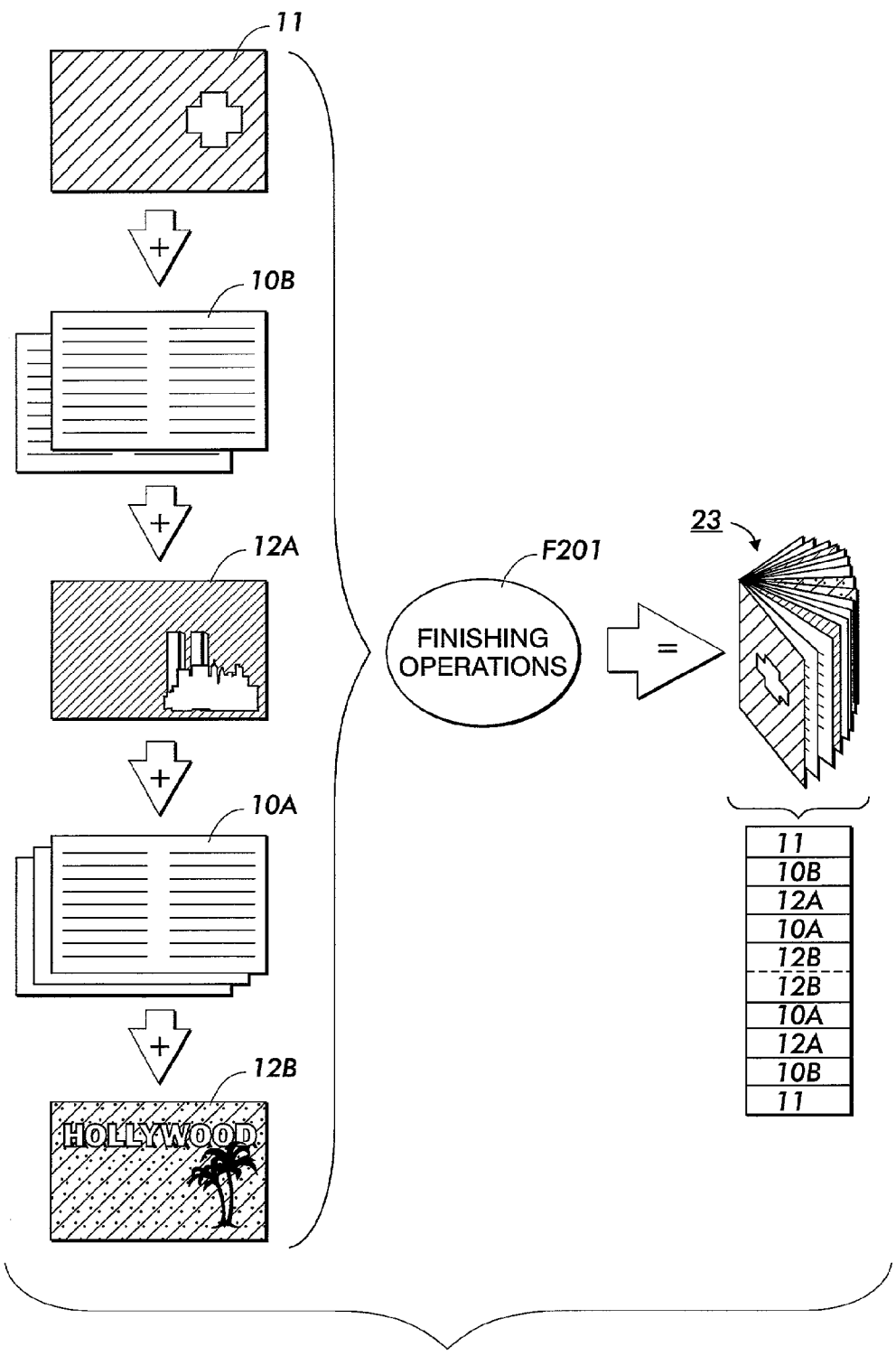

Examples of documents with different components and levels of complexity will now be shown by reference to FIGS. 1–2. Beginning in FIG. 1, a simple signature document is shown that comprises an insert component 12 placed face down on a gathering tray or table, followed by body component 10 placed on top of insert 12 which is then followed by cover 11. A finishing operation indicated in block form at F201 is shown. Such finishing operation F201 may comprise simple folding of the signature body or may include center stapling or similar binding operation. When cover 11 is placed on top finishing operation 201 folds the signature, a cover-bound document 21 is created as shown. The completed document 21 is shown to the right of finishing operation F201. For explanatory purposes, the arrangement of components is shown in box form below finished document 21.

FIG. 2 shows the result of layering two body components 10a and 10b in a stack with two insert components 12a and 12b in the order indicated. Cover 11 is added last to the stack. Completed document 23 contains the 9 layers expected from such an arrangement, with the middle layer being a double layer comprising insert component 12a.

Obviously, documents may vary greatly in complexity depending upon the number and order of components, finishing options chosen, etc. Typically, various prepress devices create individual components of the document and digitally render these components in formats that are suitable for printing. PDLs such as Postscript®-compatible languages are often used for such purposes. Subsections of the job that require different prepress or printing operations are typically divided by an operator at an early point in the process. After completion of prepress operations for each portion of the job, the operator(s) send the various portions of the job to printers appropriate for each such portion, thereby initiating different "paths" that each portion of the job my take.

Figure 3:
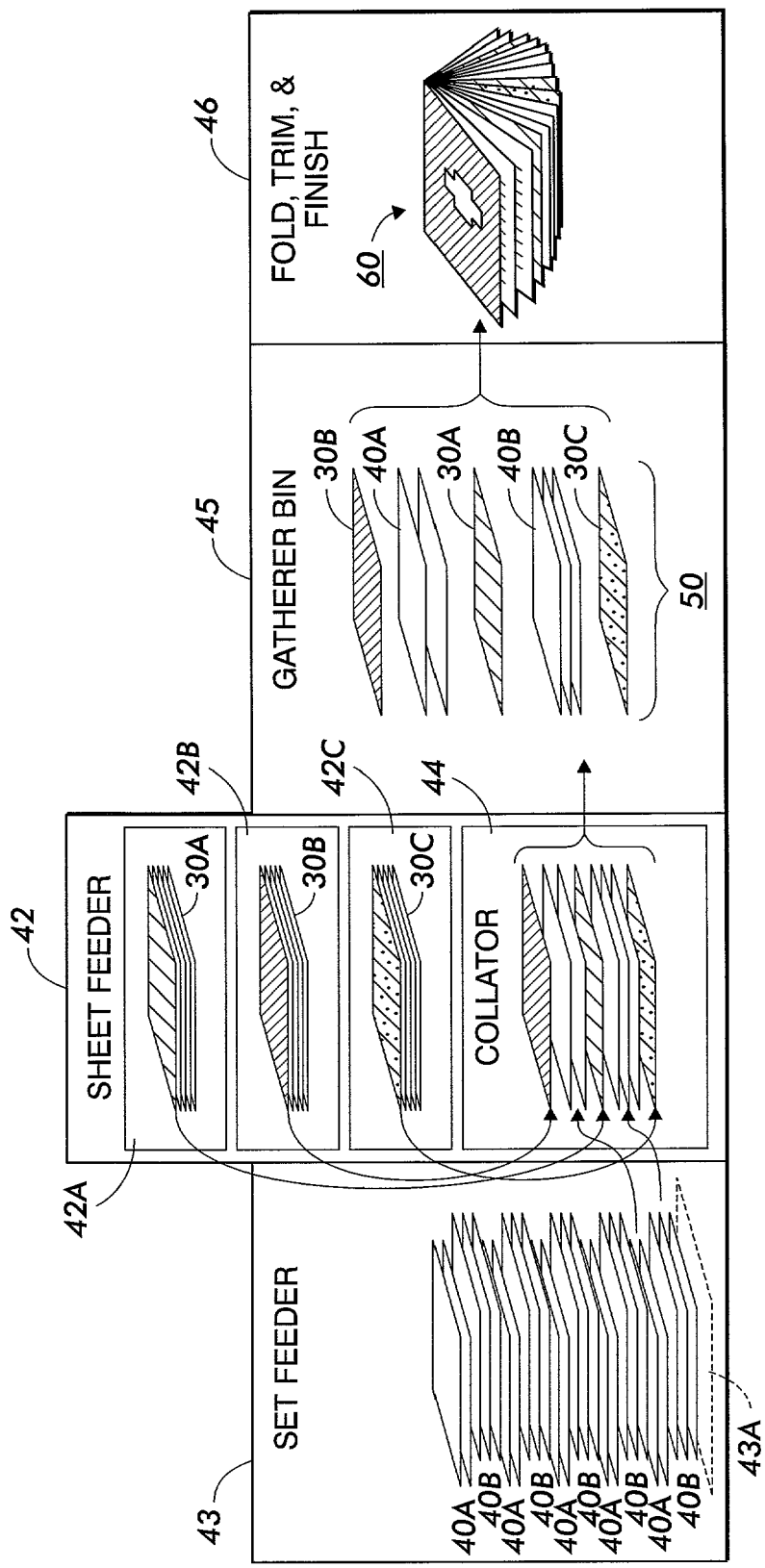

FIG. 3 shows typical assembler/finisher operations for a moderately complex document. In the shown example, a set of color portions, 30a, 30b, and 30c, have been printed by a color printer and outputted from the printer in non-collated offset form. A set of monochrome portions, 40a and 40b, have also been printed and have been outputted from the printer in a stack of alternating, collated offset sets. After printing and output into their respective intermediate output bins, the various printed sheets have been gathered from their respective printer output bins, transported, and placed in the bins shown in FIG. 3 for feeding into the assembler/finisher apparatus. Color components 30a, 30b, and 30c are placed into sheet feeder receiving bins 42a, 42b, and 42c of sheet feeder 42. An example of such sheet feeder equipment integrated coupled with book making equipment is a Model MC80 sheet feeder integrated with book maker Model SPF-20, both manufactured by Horizon International, Inc. Monochrome components 40a and 40b are placed in feeder bin 43a of set feeder 43 in a manner that maintains the alternating, collated offset stack. An example of such set feeder equipment 43 is a DocuFeed 150 sold by Standard Duplicating Machines Corporation, Inc.

It is important to note that in many jobs, receiving feeder bins such as 42a, 42b, 42c, and 43a have stack height constraints that are less than the total stack height of a particular portion of the job that was printed. In the prior art, an operator typically manually separates a stack of printed sheets into smaller stacks that will fit within the constraints of the receiving bins.

Returning to FIG. 3, collator 44 is programmed by an operator for interleaving and collating the components in the correct order. When operated, collator 44 operates in conjunction with sheet feeder 42 and set feeder 43 such that various sheets are placed in a completed stack 50 in the correct order within gathering station or gathering bin 45. Next, stack 50 is delivered to finisher apparatus 46 where it is first folded, The folded signature stack is then bound, trimmed and otherwise finished into a completed document 60. Among the finishing operations that may be performed within finisher 46 are the following: gluing in, adhesive binding, general stitching, saddle stitching, thread sewing, side sewing, stapling, scoring, and trimming.

Much prior art deals with operations that automate tasks internal to each of equipment and processes described above. In particular, much work has been done to provide automatic linkages between prepress operations and digital printing processes, including output from printers at intermediate finishing stations with capabilities such as collating. One aspect of such prior art includes creation of virtual job tickets to electronically convey information from prepress apparatus through to intermediate finishing operations of the selected digital printers. See, e.g., U.S. Pat. No. 5,995,721 issued to Rourke et al. U.S. Pat. No. 5,615,015 issued to Krist et al.; U.S. Pat. No. 5,760,775 issued to Sklot et al. In Rourke et al., for instance, prepress processes examine the attributes of a print job in order to determine which of a variety of printing apparatus are capable of printing each particular portion of the job in accordance with the specified attributes. The instructions governing printing of each specific portion are provided to each printer pursuant to a virtual job ticket. In Rourke and in other prior art, however, digital tracking and control linkages between the paths of various job portions sent to different printers is generally lost after each portion is sent to a different printer. The virtual job ticket is used only during the printing process itself and during any post-printing processes directly linked to the printing phase of the job. Thereafter, the parsed portions of the job are re-integrated not by use of a virtual job ticket providing instructions to offline finishing but by dropping sheets of one parsed portion into "holes" left in the printing queue of a second portion. See Rourke, column 13, line 11–39. Another characteristic found in Rourke and in other prior art is that a job is parsed into portions based upon printing characteristics and not upon constraints to be encountered during the entire printing and finishing process.

Although two-way digital tracking and control linkages are common within printers that are physically integrated with their own intermediate finishing stations, there are no two-way digital tracking and control linkages between a stand alone printer system and offline assembler/finisher apparatus such as shown in FIG. 3 as 42–46. With respect to assembler/finisher systems that are not physically integrated with their respective printers, the following incomplete list of data characterizing a job and the work pieces of the job are useful for programming some or all assembly/finishing operations: the number of sheets of each type; media type; media thickness; orientation of sheets; organization of sheets within each stack of sheets; order of assembling sheets or stacks; operations to be performed; locations for scoring, folding, trimming, cutting, etc; and the type and placement of binding. Many other instructions are often utilized in addition to this basic list of instructions and parameters.

The need in both the prior art and in the present invention is to efficiently convey to and program the appropriate assembler/finisher systems with the above assembly/finishing data, then to track progress of the job through the finishing operations, and finally to maintain integrity of the job in order to detect and/or prevent defective finished documents.

The prior art teaches several methods for accomplishing the above tasks with varying degrees of satisfaction. A very common approach is for a human operator to separately program the assembler/finishing system. Often, the information to program the finishing operation is provided to the operator in a written or printed sheet or set of sheets, called a traveler sheet, that incorporates information describing assembler/finishing operations for all portions of the job. When preparing to load the stack into the finishing equipment, the operator reads the traveler sheet for the relevant assembly/finishing instructions, including the order in which the components are to be assembled in the finished product. A complete set of attributes for each component is not provided since the skill and experience of the operator enables the operator to select proper bins, parse stacks, orient sheets, and similar tasks when preparing and programming the assembler/finisher device. A more modern version of this same basic system uses a traveler sheet that is encoded with barcodes or other machine readable coded information. When ready, the operator places the traveler sheet before a digital reader which then displays the information to the operator for manual programming. Yet another version of this idea is to place a machine-readable code such as a bar code or glyph on a sheet associated with each job. This sheet may be a cover sheet placed on each stack of sheets. The code is read by a digital reader and its information is used to set up equipment for the job. Even with the ability to encode some job information digitally, the information required in conjunction with moderately complex jobs for programming of off-line assembler/finisher equipment is so complex that in the prior art some manual programming is required.

The complexity of interrelating and automatically programming all of the above printing, assembling, and finishing operations can be understood by contemplating the innumerable parameters and operations that must be coordinated during the course of a reasonably complex printing job, especially one involving multiple printers and multiple finishing operations and assembler/finisher devices. In addition to all of the variables relating to paper selection (e.g. size and type), PDL or other page descriptions, and other parameters and operations applicable from prepress Phase 1 through completion of printing Phase 2, the assembly/ finishing Phase 3 requires programming of information that both (1) specifies the complicated details of assembly and finishing operations to be performed upon each sheet or set of sheets within the job and (2) relates each sheet or set of the job to every other sheet and set of the job. Especially when the sheets are arriving from different sources such as from multiple printers or from both printers and inventory, existing systems have only been able to automate a portion of these programming tasks or have succeeded in performing both of these programming tasks only in very carefully prescribed circumstances.

For instance, in U.S. Pat. No. 5,859,711, issued to Barry et al., the problem is discussed in the special case where all of the pages of a document are sent to a job controller as one job and are then divided at page breaks such that each page is treated as a separate print job. By dividing the one job into a plurality of jobs on a page-by-page basis, the various pages can be allocated to a multitude of printers such that one or more printers can be operated as one virtual printer. The advantages include greater speed and the ability to send color pages to color printers and monochrome pages to monochrome printers, thereby optimizing the use of each. In the above manner, Barry teaches a method of optimizing production of a job through the printing Phase 2. Barry does not, however, teach a method for optimizing the assembler/finisher portion of the production or for arranging the printing, separating, and stacking of portions of a job with a view to the capabilities and constraints of the assembler/finisher equipment. At column 18, lines 37–47, Barry provides part of its solution to the problems created when a job has been parsed to different printers and needs to be reassembled: "It is only important that, when the stacks are defined within a given printer, there is some indication, such as a separator page, that will allow the particular stack created between separators, to be assembled with another stack from another printer in the desired print job output." (lines 42–47) At columns 37 and 38, a second portion of Barry's solution is disclosed by teaching that a distributor control can operate to configure and reconfigure the automatic finishing device in response to how a job is divided into stacks, with each stack being treated "as individual entities and queuing them up and processing them independent of how fast another job stack in a given job is processed through an adjacent print engine." Column 37, lines 12–15. Barry also teaches that a distribution control can configure automatic finishing devices or such devices may be configured by reading instructions printed on each separator sheet in bar code form.

Thus, Barry is concerned with a method of dividing a job into portions that can be routed to different printers for more efficient printing operations. Its finishing teachings are limited to methods for recombining the separated portions of a job back into the correct order for final finishing. There is no teaching concerning how to combine the job portions except how to collate the portions arriving from different stacks. There is no teaching of how to combine printed sheets with non-printed or previously printed sheets taken from inventory. There is no teaching concerning how to break a stack apart except in response to the job portions created for optimized printing. If further divisions of stacks are necessary after printing in order to enable assembly/finishing operations, Barry lacks any method for analyzing or implementing such divisions. Most importantly, Barry does not teach that the capabilities and constraints of assembler/finishing equipment can be used to divide a job into portions.

Figure 4:
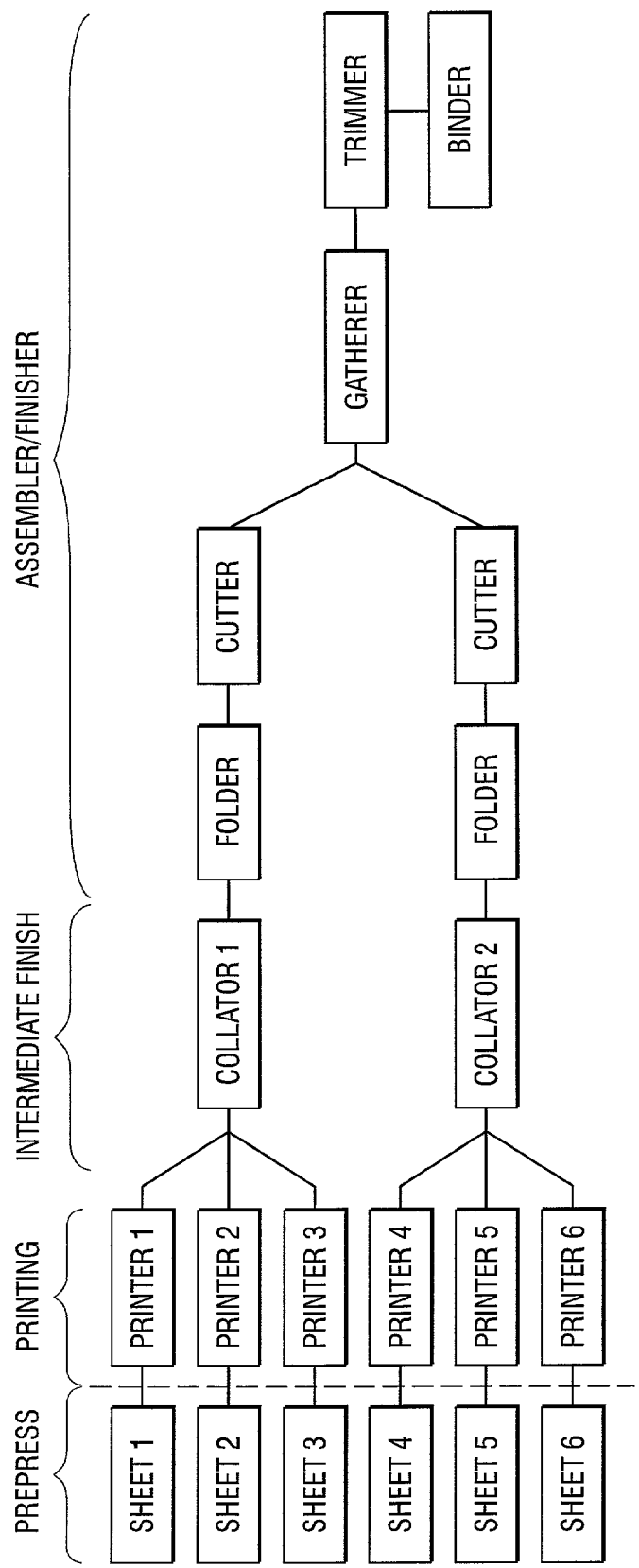

Perhaps the most complete attempt to provide a structure for automated programming of certain specified types of print jobs is the International Cooperation for Integration of Prepress, Press, and Postpress (CIP3) Print Production Format issued by the Fraunhofer Institute for Computer Graphics. The web address for CIP3 is: http://www.CIP3.org. First issued in 1995, CIP3 provides an ability to create a digital "traveler sheet" written in the Postcript language. CIP3 enables a complete digital description of a document and all of its production steps. It is a proposal for a description language, not a control algorithm. As a description language, CIP3 provides one method of relating each page of a job to every other page of the same job. As described in the Specification of CIP3, the CIP3 format is intended to enable automatic programming of assembler/finisher equipment. What is missing in CIP3, however, is the automatic programming itself. What is also missing is an ability to match described production operations with the capabilities and constraints of the particular equipment available in conjunction with this job. CIP3 is therefore not useful in selecting or optimizing the actual equipment to be used when planning the job. CIP3 also lacks the ability to inter-relate the production effects of one job to a second job, and CIP3 is therefore of limited value in production planning of multiple jobs. Also, by failure to divide a job into subparts that conform with the constraints of the actual equipment to be used, CIP3 is limited in the depth of its ability to relate each sheet of a job to all other sheets that have been prepared as part of the job. FIG. 4 shows in schematic form the type of information that can be described using CIP3. Along the Y-axis is a list of the different sheets in this particular job. Note that there is no information concerning how many sheets of each type are printed since CIP3 is concerned with describing the sheets of a single end product and not of the flows necessary to print a production job. The X-axis is a list of the operations that will be performed on each sheet, including in this case, at the intermediate collator step, the merger of the various sheets into stacks. These stacks will then be separately folded and cut and then gathered together, trimmed, and bound. CIP3 is robust enough to associate fairly complex production processes to particular sheets or stacks of sheets (called partial products within CIP3), including such processes as the gathering of multiple partial products of the job and the binding, finishing of such gathered partial products into a stitched or glued document. See Table 3–13, CIP3 Specifications, Version 3.0, Jun. 2, 1998. Even where CIP3 provides an adequate description language for parts of the job, however, it does not provide methods for actual management, control, and tracking of the job while in production. In other words, CIP3 is intended to help the programming of a job by describing its parts but does not actually perform or direct the programming nor the implementation of the job.

The ability to track and associate the complex data associated with each or stack of sheets within a complicated print job is greatly hindered by the innumerable equipment and processing parameters that characterize and constrain use of each piece of equipment. For instance, every item of equipment shown in FIG. 3 may have different paper path constraints or bin-height constraints. Some types of sheet stock may be too thin or too rigid for certain of the printers or assembler/finishers in the system. Some portions of the job may require an intermediate finishing step such as lamination. Specialized equipment such as laminators may require that sheets be delivered and output in a particular orientation, e.g. long edge first, which constraints then require a re-orienting process prior to insertion into the paper path of the next selected piece of equipment. Some portions of the job may require different types of folding, trimming or cutting operation than other portions of the same job. Within a typical commercial print shop, the number and type of constraints affecting selection of different pieces of equipment or combinations of equipment are inherent and innumerable.

The problem of coordinating equipment constraints is further complicated because of inherent mismatches between the output of printers and the constraints of assembler/finisher equipment. For instance, when a stack of sheets from a printer has more sheets than can be received in the assembler/finisher feeder bins, then a human operator or a machine conveyance system typically divides the larger stack by grabbing whatever number of sheets appear to fit within the feeder bin capacity. This means that the various assembler/feeder bins are filled with unequal numbers of sheets. It also means that a stack of printed sheets gets divided and separated. The separated stacks are typically stored in intermediate bins and must be stored, tracked, and retrieved when needed. Even where large stacks of sheets are divided by a manual or automated counting procedure such that each separated stack is maintained with a known quantity of sheets, there is no ability in the prior art to dynamically adjust the size of such stacks to conform to the varying constraints affecting each particular printing job and the particular equipment selected for that job. Moreover, stacks of pre-counted sheets are of little use when responding to sheets that are found defective, missing, or damaged. Lastly, where a job can be routed to one of a variety of assembler/finisher systems, each having different constraints, it would be desirable to dynamically change the stacks of printed sheets in order to optimally conform to the constraints of the particular assembler/finisher equipment that becomes selected. This would be especially desirable when managing queues of finishing jobs in systems that are capable of rerouting assembler/finisher operations in response to equipment breakage or unavailability due to use of initially selected equipment with other jobs.

As described above, another task required during the print production process is effective tracking and integrity checking. Within individual printer systems, these tasks are well understood. For instance, in typical production printing systems such as the Docutech® Model 6155 marketed by Xerox Corporation, sheets are counted when fed from the system input feeder and are timed or recounted during or after every major operation performed within the machine. In the event that a sheet does not arrive at a designated station within the time constraints permitted by the system or is otherwise detected as missing, a jam is declared and the portion of the machine apparatus operating prior to the jam is paused. An operator is then directed to clear the jam by removing all sheets residing in the paper path. Since the system controller has tracked and counted each sheet, it knows the number and image file identity for each sheet that has been removed. When the system detects that all sheets have been cleared, the controller directs the re-imaging and processing of each of the removed sheets. For duplicator systems with recirculating document feeders (RDFs), the same concepts apply except that the controller directs the RDF to circulate the input document pages until the first missing document page returns to the top of the imaging queue.

For print jobs requiring use of multiple printers, the above tracking and integrity functions are less completely managed in the prior art. For instance, in the state-of-the-art Book Factory® system launched by Xerox Corporation in 1999, a primary production printer based upon a Docutech Model 6180 printer system is physically integrated with assembler/finisher apparatus capable of any of the following finishing operations plus appropriate combinations of these operations: Collecting, Folding, Trimming and Adhesive Binding. The Book Factory system also comprises an assembler with a manually loaded input tray for accepting inventory sheets, including covers, printed or prepared by other printers or processes. Although the Book Factory assembler/finisher apparatus can count and time the progress of sheets in much the same way as described above in relation to single printer systems, there is no two-way communication concerning job status to the printer or inventory systems that supplied the manually input sheets. Thus, in the event a jam is declared, there is no method by which other printer systems may automatically be directed to reprint the removed sheets. In normal operations, operators prepare for missing or destroyed sheets by printing extra copies. Where extra copies are not available, then an operator must reprogram the other printer system and reprint the job. In any event, the result is typically waste of extra or removed sheets, consumption of extra consumables such as paper and ink, and expenditure of valuable time by operators and expensive printers.

In sum what is missing in the prior art is:

1) an integrated digital architecture for interactive control, tracking and integrity functions of all three phases of the prepress/printing/finishing process;

2) an integrated apparatus and method for enabling an operator, prior to printing of a job, to provide complete instructions for complex assembler/finishing operations, especially if off-line from the printer controller;

3) a method for accurately and completely describing the final document form of a complex document in a manner that enables both printer controllers and assembler/finisher controllers to instruct and control their respective printing and assembling/finishing operations;

4) an apparatus and method for dividing and managing a print job and associated work flow in response to constraints of both the available printing systems and the available finishing systems;

5) a queue management system that manages the entire print and finishing process in accordance with the availability of specified printers and of specified assembler/finisher equipment;

6) an interactive integrity check system capable of tracking each sheet through each production process, especially those portions of the process involving assembler/finisher operations that are offline from the printer controller; and 7) apparatus and method, acting in response to an interactive integrity check function, that automatically instructs printers to add or replace sheets not available to the assembler/finisher apparatus when such assembler/finisher apparatus calls for such sheets.

SUMMARY OF THE INVENTION

One aspect of the present invention is a method for a virtual finishing job ticket database used in a finishing system having at least one finishing device controlled separately from production devices that produce workpieces of a job wherein such finishing device has capability and constraint attributes, such method comprising: (a) storing in the database a list of capability and constraint attributes for each available finishing device; (b) receiving finishing job description information, including descriptions of job segments of the job; and (c) storing the finishing job description information in the database.

Another aspect of the present invention is a method for a database system used in a finishing system having at least one finishing device with capability and constraint attributes and having a production monitor controller that determines job segments of the job based upon the capability and constraint attributes and that determines an hierarchical description of the job and its components, such method for a database system comprising: storing capability and constraint attributes in the database; communicating the capability and constraint attributes to the production monitor controller; creating a job model location within the database for storing a description of the job and its components, including job segments; and receiving from the production monitor controller information that describes the job and its components, including descriptions of job segments of the job; storing the description of the job and its components, including job segments, in the job model location within the database.

Yet another aspect of the present invention is a structure for a virtual finishing job ticket database used in a finishing system having at least one finishing device and a production monitor controller, such virtual finishing job ticket database comprising: (a) job construction data; (b) control data for instructing performance of at least one finishing device; and (c) integrity data used after performance of the finishing device in order to confirm that the job was finished in accordance with the job construction data.

DETAILED DESCRIPTION OF THE DRAWINGS

For purposes of the present invention, the following definitions shall apply:

A "document component" shall mean a collection of one or more sequential sheets of media that have similar qualities or characteristics and thus would be printed or non-printed and would be finished or produced in a similar manner. Examples of document component types are covers, bodies and inserts. When collected together in a specific order, a collection of document components may form a complete "document". Each document component may require its own intermediate finishing operation before its final assembly/finishing into a "document". For instance, a cover sheet may require lamination in an intermediate finishing process before conveyance to the final assembly/finishing apparatus.

A "document" shall mean a collection of one or more document components placed in a specific order and finished in a manner that relates the various document components to each other.

A "document form" shall refer to the manner in which the various components are finished into a composite form, including such operations as folding, cutting, stitching, binding, and gluing. Each document form requires unique image imposition, printing, finishing process requirements and physical identifying characteristics. The structure of most typical documents can be classified into one of 7 standard "document forms":

Flats: One or more sheets of media, unfolded, that are either not bound together or are bound by means of a device such as a staple or a wire that penetrates the media from one side for the first sheet to the other side of the last sheet.

Signature: One or more sheets of media that are folded. The sheets may or may not be stitched together but if they are, they are stitched on fold from outside to inside. The images are imposed on the printed sheets of media such that after folding the images on the sheets from pages that are in the correct order for reading (readers spread).

Perfect Bound: Individual sheets of media grouped together or gathered signatures that are commonly glue-bound to a flexible, wrap-around cover which protects the body/contents. The edges of the book-block and cover are usually flush with each other.

Case Bound: Individual sheets of media grouped together or gathered signatures that are commonly glue-bound to a rigid, wrap-around cover which protects the body/contents. The edges of the cover usually extend past the book-block.

Lay Flats: Individual sheets of media with holes or notches along one edge grouped together and commonly bound to a separate front and back cover which protects the body/contents. Common binding methods include wire-coil, plastic-coil, plastic-comb, 3, 5, and 9 ring binders, etc. The document lays flat and does not close when opened up. The edges of the cover usually are flush with the book-block.

Tape Bound: Individual sheets of media grouped together and commonly bound to a front and back cover which protects the body/contents. The binding method is an adhesive tape that wraps around the book-block overlapping the front cover and back covers along the spine edge. The document usually will not lay flat when opened up. The edges of the cover usually are flush with the book-block.

Other document forms can be specified as needed.

A "constraint" shall mean a limitation of a device based upon its design or use. A "constraint" may be permanent or temporary. Examples of permanent constraints would be inflexible bin heights or widths, temperature limits for laminators, bin type (set feeder or sheet feeder), method of feed (e.g., top or bottom feeder), required order (n-to-1 or 1-to-n), face up, face down, required orientation (e.g., leading edge must be long or short dimension), paper path width, thickness for folding and trimming, transformations enabled within the device (e.g., face up to face down, lead-edge reversal to trial-edge), landscape to portrait orientation, etc.) and similar limits related to a device's design. Examples of temporary constraints include: a period of time that a piece of equipment or part of equipment, such as a particular bin, is not available due to a broken part or use for another job; or (b) the type of media, glue, binder material, etc., then available for use within a particular piece of equipment.

A "job segment" shall mean a stack of sheets produced by a common printing or finishing process and conforming to the same printing and finishing constraints. A "job segment" may contain a single document component, a portion of a large document component, or a collation of several document components. As will be explained below, "job segments" are identified in order that document components with similar printing and/or finishing requirements are grouped together for efficient printing, handling, and finishing. For example, if a document has two 8.5"×11" monochrome body components, both body components may be grouped in the same job segment in order that they will be printed on the same printer at the same time. Depending upon requirements, these components may be output at the printer as collated or non-collated stacks and, if the components are collated, the collated stacks may be placed in an offset manner in order to indicate separation between the collated sets. As another example that is particularly pertinent to the present invention, if an input bin of the selected finishing apparatus has a stack height constraint of 2.2 inches, then the maximum stack height of a "job segment" will be 2.2 inches even if the total stack height of a particular document component or of a collated stack of components is much higher. For this situation, a "job segment" during printing phase 2 may comprise all of the sheets that are printed at the same printer. Within this large job segment stack, however, smaller "job segments" limited to 2.2 inches in height may be separated in an offset manner or separated by separator sheets. Thus, segmentation of a job would be done based upon an offline finishing constraint that does not otherwise affect the operations of the printer system.

As used herein, "finisher" and "assembler/finisher" shall both refer to systems designed to perform assembly and/or finishing operations.

As used herein, a "system" shall mean any organization of devices, hardware, and software that can be operated cooperatively to accomplish performance of a job.

A "node" means each unit of a job arranged within a hierarchy of units, i.e., the job itself, each document within the job, each document component within each document, each stack, sheet, set of sheets, etc. The hierarchy descriptors found in CIP3 can be useful in identifying many of the "nodes" of a job. When used in conjunction with object-oriented software, a "node" may be treated as an "object" that can moved or manipulated by itself or may be opened into subparts that themselves are objects that can be moved or manipulated.

One aspect of the present invention is a software architecture by which the assembly and finishing phase 3 of a complex document can be managed as early as during the initial phase 1 set up of the job by use of an architecture in which the document is represented as a series of individual document components that, when assembled in a specific order, can be classified in one of the specified document forms.

Figure 5:
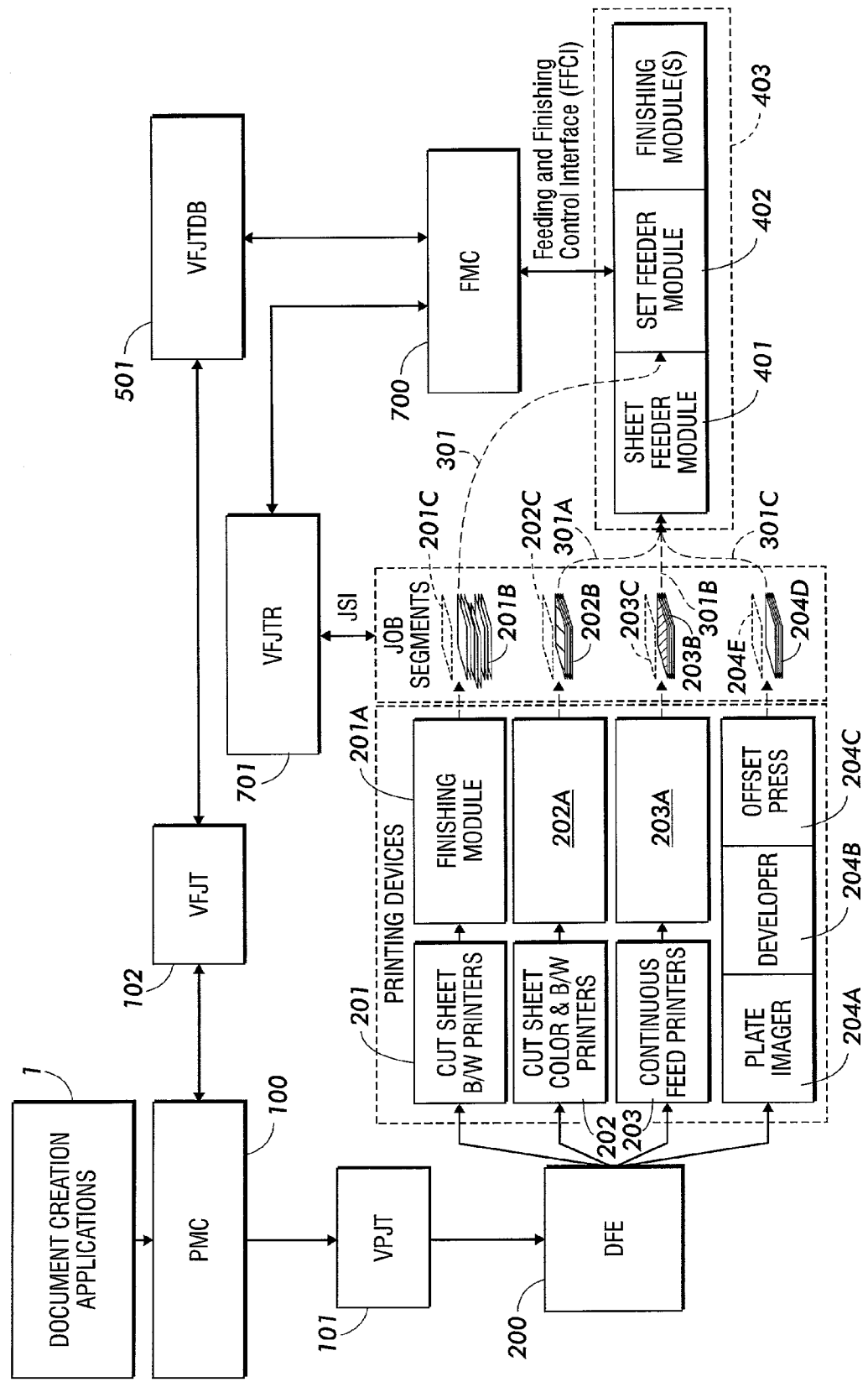

Turning now to FIG. 5, an overview of this aspect of the present invention is shown. FIG. 5 contains a block diagram showing the flow of work using the present invention and showing some of the relationships between various items of equipment using the present invention. Within FIG. 5, box 1 represents the prepress operations of phase 1. The output of the prepress operations of box 1 is a set of appropriate PDL files that are delivered to a Production Monitor Controller (PMC), 100. As described more fully below, the PMC is a controller that coordinates overall production of the print job.

Figure 6:
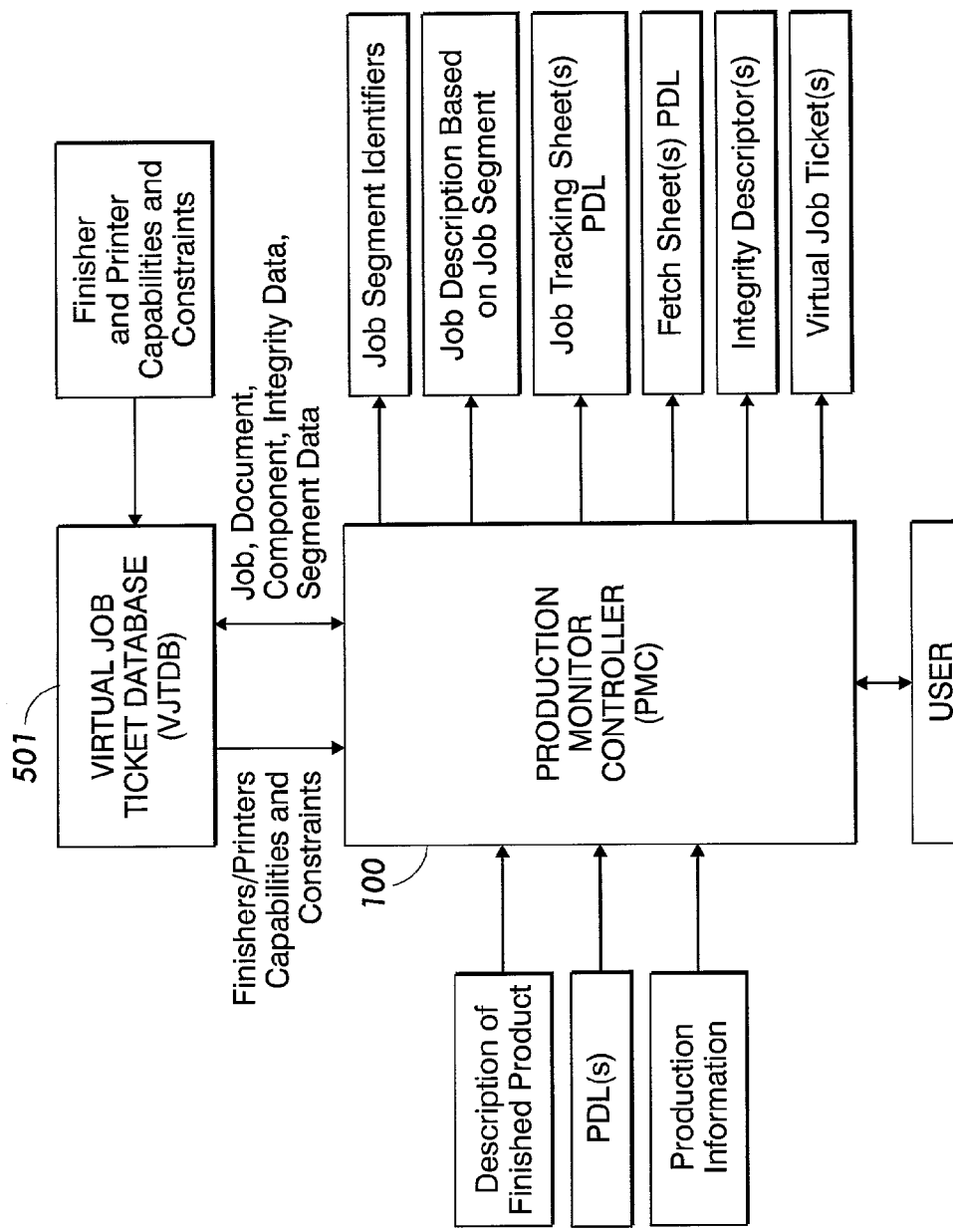

FIG. 6 shows the typical inputs and outputs of a PMC 100 in block diagram form, including the relationship between the PMC and a Virtual Finishing Job Ticket Database "(VFJTDB)", 501, to be described below. In general, the inputs to the PMC 100 include some or all of: 1) from the Virtual Printer Job Ticket Database ("VPJTDB") (described below)VJTDB, a list of printer capabilities and constraints; 2) from the VFJTDB, a list of assembler/finisher capabilities and constraints; 3) a description of the finished product which may be a CIP3 or similar description; 4) PDLs and other files for the content to of each sheet to be printed; 5) production information such as the number of copies, targeted printing devices, and any special finishing or packaging attributes, including, without limitation, the identity and retrieval location of any non-printed and/or inventory items. In general, the output from the PMC includes identification of each job segment for each operation within the job as well as a complete set of phase 2 printing and phase 3 assembling/finishing instructions for each job segment. More specifically, the output from a PMC comprises some or all of: 1) a job segment descriptions and identifiers for each job segment; 2) a database representation (such as the VJTDB description explained below) of the structure of the job segments and the document components, sheets or sets within the job segment; 3) a PDL file for a job tracking sheet, if any; 4) a PDL for a fetch sheet, if any; 5) integrity descriptors encoded into the VFJTDB for later use by a Finishing Module Coordinator (FMC); 6) virtual job tickets for printers and Assembler/finishers; and 7) a prompt to call for one or more human operator responses. A more detailed description of the processes within a PMC is provided below in relation to FIGS. 7–10.

Returning to FIG. 5, the instruction set for phase 2 printing and phase 3 assembling/finishing is output from PMC 100 in the form of both a Virtual Print Job Ticket (VPJT), 101, and a Virtual Finishing Job Ticket (VFJT), 102. The VFJT and VPJT may contain the complete instruction set for the job or may simply contain reference pointers to a database where such information is retained. The VPJT, 101, is conventional in the art as discussed above in relation to U.S. Pat. No. 5,995,721 issued to Rourke et al.; U.S. Pat. No. 5,615,015 issued to Krist et al.; U.S. Pat. No. 5,760,775 issued to Sklot. The details of a VFJT, 102, and the method of its creation by a PMC, 100, will be described in more detail below.

The data for each VFJT is recorded by the PMC in a Virtual Finishing Job Ticket Database (VFJTDB), shown in FIG. 5 as 501. A VFJTDB is a database or a data file that contains all job construction, control and integrity data necessary to take the prints coming from the printing device (s) and perform the necessary finishing processes to turn the prints into the desired final document form. The format of the VFJTDB can be hard copy (print), soft copy (floppy, CD-R, CR-RW) or electronic (electronically stored in memory or on a hard disk drive) copy form. It could be either human or machine-readable or both.

The type of data and instructions required in a VFJTDB 501 for each job are information such as but not limited to: accounting and administration information, sheet, set and job level finishing instructions, color and print quality control data, registration data, etc. The data and instructions also contain a description of the job segments (stacks and stacks of sets) of the job being produced and instructions on how to reassemble these pieces to complete the processing of the job. Additionally this information can enable the automatic setup of the finishing device(s), integrity control and monitoring throughout the full scope of the production processes. The VFTDB provides the basis for a direct link between the offline finishing operations and the integrity control functions of online printing and intermediate finishing systems. The VFJTDB data can take on the form of a proprietary format or an industry standard format such as but not limited to a modified form of CIP3. More information concerning the structure and use of the VFJTDB 501 is contained below.

Returning now to FIG. 5, phase 2 of the printing process is commenced after delivery of the VPJT, 101, to one or more Digital Front End Print Controllers (DFE) represented by box 200. Such DFE's are conventional in the art. Examples include PDL products made by Splash, Harlequin, Adobe, and others. In conformance with instructions provided in the VPJT, 101, the print job is divided into separate printing job segments and is distributed to various print engines for printing using the printer or press which the operator or PMC, 100, believed to be optimal when the VPJT was first established. Alternatively, the VPJT may provide that the DFE, 200, sometimes through interaction with the PMC, 100, may automatically select the appropriate printing device based upon dynamic queue and print selection criteria.

Boxes 201–204 of FIG. 5 are examples of various types of printers to which document components may be delivered for printing. Printer 201 is a cut sheet digital printer connected to an integrated finishing module 201A. Integration between printer 201 and finisher module 201A is accomplished using DAF or MFA-type protocols. As discussed above, a typical finisher module 201A includes capabilities such as collation, folding, and simple binding such as stapling. Printer 202 is a cut sheet printer with a combination of color and monochrome printing capability. The Document Centre® Color Series 50 printer sold by Xerox Corporation is such a printer. Finisher module 202A is integrated with printer 202 as shown in FIG. 5 and may have capabilities similar to that described in connection with finisher 201A. Similarly, printer 203 is shown as a continuous form feed printer and is integrated with finisher module 203A. Printer 204 represents the various apparatus and processes normally associated with offset printing, including the prepress steps of preparing offset plates at a plate imager 204A, plate developer processor 204B, and offset printing press 204C. Unlike printers 201–203 which may be digitally integrated with their respective intermediate finishing modules 201A–203A, offset presses are not digital imaging devices and lack direct digital integration with assembly and finishing equipment.

As shown in FIG. 5, each of finishing modules 201A–203A and offset press 204C place their respective job segments in their respective output trays or bins 201B–203B and 204D. When placed in such trays or bins, the job segments or may not be collated, stacked or otherwise separated for handling and conveyance. Also as described above, each of finishing modules 201A–203A may provide some intermediate level of finishing such as folding or stapling. Multiple document components may be printed or assembled at the same printer and intermediate finishing station and be treated during this phase of the job as one job segment. Conversely, a single large document component may be output in a stack with separator sheets or offset stacks indicating multiple job segments within the single document component.

Another aspect of the present invention is the association of a unique Job Segment Identifier (JSI) with each job segment. In FIG. 5, a sheet containing a JSI is shown in association with each job segment that is output from printers 201–204. The respective JSI sheets are labeled 201C–203C and 204E, respectively. For complex jobs or for document components that are printed in large stacks, there may be many JSIs corresponding to many job segments within the job or within the stacks.

A JSI can assume any form that can be associated with a job segment throughout the finishing and other applicable printing processes. Among such forms are copies stored in (a) a printed sheet printed and placed on top of a printed job segment, (b) system memory such as hard drives, (c) magnetic media such as floppy disks or magnetic strips, (d) optical memory such as CD-ROM or CR-RW disks, (e) bar code symbols printed on sheets associated with the Job Segment, or (f) any other means by which machine or human readable identifying information may be associated with a Job Segment. A JSI may be machine, human readable, or both depending upon the phase of the job. Indeed, in the event that a scanner is capable of reading the top printed page of a job segment in such manner that the job segment can be uniquely identified, then no special symbols or special top page would be necessary. Thus, each JSI contains, at a minimum, a job and job segment number or other identifier that uniquely identifies the job segment from all other job segments. Typically, the JSI comprises both a unique job number and a Job Segment Identifier Code (JSIC). The job number uniquely identifies the print job from all other print jobs and the JSIC uniquely identifies the job segment. In one embodiment, the JSIC comprises recognizable unique text on the top sheet of a job segment, which JSIC forms a vector to a JSI that remains encoded in digital memory. Whichever form a JSI takes, the JSI serves as a reference pointer to the portion of the VFJTDB that describes the contents of the identified job segment. The JSI remains associated with the applicable job segment when it is transported from the printing device(s) to other finishing processes. This enables tracking of the job segment from the printing device(s) to the assembler/finisher apparatus. Whether or not the job segments are part of a job that requires prints to be produced on one or more printing device(s), each JSI will have a common job number but a different JSIC that uniquely identifies each particular job segment of the job.

Figure 7:
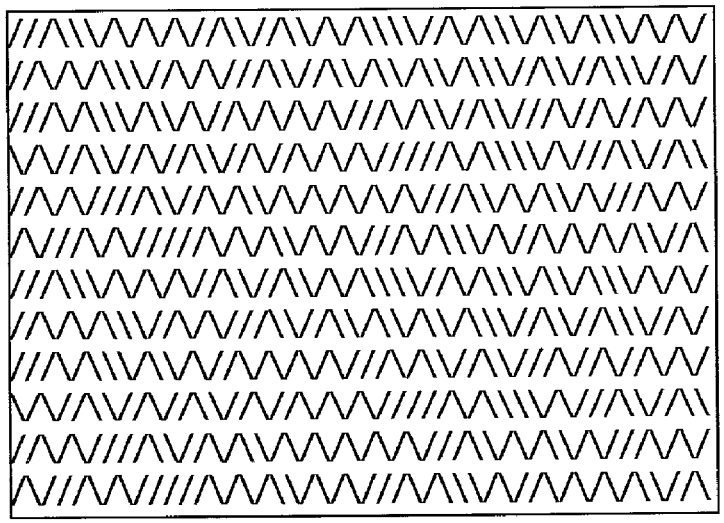
Figure 7:
Figure 7:

Returning to FIG. 5, the JSIs are shown in the form of a printed sheet called a Job Segment Identifier Sheet (JSIS) that is typically printed along with the sheets of the job and is placed on top of the job segment stack in the output trays or bins, 201B–203B and 204D. Such JSIS sheets are shown in FIG. 5 as 201C–203C and 204E. Information on a JSIS comprises either (a) a pointer (the job number and JSIC) to a Virtual Finish Job Ticket Database (VFJTDB) stored in some other electronic or soft copy format or (b) the portion of the VFJTDB itself that provides instructions for the job. Such instructions may be printed on the JSIS in electronic or human readable form. In contrast to conventional separator sheets that are placed upon each stack of printed output no matter how large the stack, each JSI serves as a unique identifier of each job segment of a print job. An example of a JSIS is shown in FIG. 7. Human readable text comprising the JSI and job instructions is shown at region 601. In region 602, machine readable glyphs are shown containing the full data content of the VFJTDB applicable to the identified job segment. In region 603, a machine readable bar code is shown which comprises a pointer to the VFJTDB stored elsewhere. Once all sheets of a job and all JSISs have been placed in the output bins or trays, phase 2 of the printing process is complete.

Phase 3 of the printing process comprises the final assembly and finishing phase wherein the various document components are gathered from output trays or bins 201B–203B and 204D, assembled in a particular order, and finished into a specified document form. In the prior art, where multiple printing devices are used, operators configure and operate these phase 3 steps separately from operations performed in each of Phases 1 and 2. Only in those instances in which all of the assembly and finishing is accomplished within a single digital printer and governed by a unified print/finisher controller does the prior art teach that phase 3 can be configured and controlled automatically. In FIG. 5. arrows 301 and 302A, B, and C show the conveyance of printed job segments from output trays or bins 201B–203B and 204D to finishing Set Feeder Module 402 and Sheet Feeder Module 401, respectively. In conventional systems, such conveyance is often manual although automated conveyance systems are used in certain applications. Even when automated conveyance systems are utilized, the prior art does not teach a method by which offline assembler/finisher equipment may be programmed to automatically process a complex assembly and finishing operation based upon instructions created prior to printing of the sheets.

In the present invention, each job segment arrives at the assembler/finisher apparatus with a JSI reference pointer. As noted above, this typically will appear on a JSIS although any form of JSI will suffice. The purpose of the JSI is to identify a particular job segment to a Finishing Module Coordinator (FMC), 700, which is a controller of the present invention that directs the assembler/finisher operations. In FIG. 5, a Virtual Finishing Job Ticket Reader (VFJTR) is shown as 701 and is responsible for reading the JSIS or for otherwise providing information to the FMC, 700, sufficient for the FMC to determine the unique JSIC. Humans may also intervene in the process to submit JSIC's to the FMC, particularly if a JSIS is only human readable. The FMC, 700, is a software-based controller that manages, interprets, sequences, and allocates assembler/finisher production data. Using a variety of interfaces to each assembler/finisher device, the FMC communicates to each device the data required to program that device for implementation of the job. It tracks each job segment through the process and ensures that job segments are properly loaded before the devices begin operating. The FMC also typically provides information to human operators concerning job status and in order to enable operators to make production decisions where necessary or appropriate. The FMC operates by receiving the JSI that identifies each job segment and determining whether the JSI itself contains all required assembler/finisher data. If a JSIS or similar JSI does not provide all instructions for finishing the job, then the FMC uses the JSIC to retrieve all relevant information concerning the job model stored in the VFJTDB. The FMC then reviews the assembler/finisher combinations prepared by the PMC to ensure that all identified devices are currently available. Once this condition is satisfied, then the FMC determines the bins or other assembler/finishing locations where each job segment should be placed. In general, the FMC communicates with the PMC through the VFJTDB. Where assembler/finisher devices are automatically programmable, the FMC typically is programmed to interact with the specified interface format for each device in order to automatically provide programming instructions. Job tracking and integrity information would also be provided. When all required job segments have been loaded in their appropriate bins, the FMC would either direct the assembler/finisher devices to begin or would inform human operators that the job is ready. In this manner, the complete assembler/finisher operation can be controlled, implemented, tracked, and checked for integrity. More details concerning the design and operation of the FMC is provided below. For purposes of this invention, it is important to note that the functions of the PMC and FMC are described as separate controller functions. It is possible in the present invention for these controllers to be combined or for some functions described in relation to one controller to be reallocated to the other controller.

Figure 8:
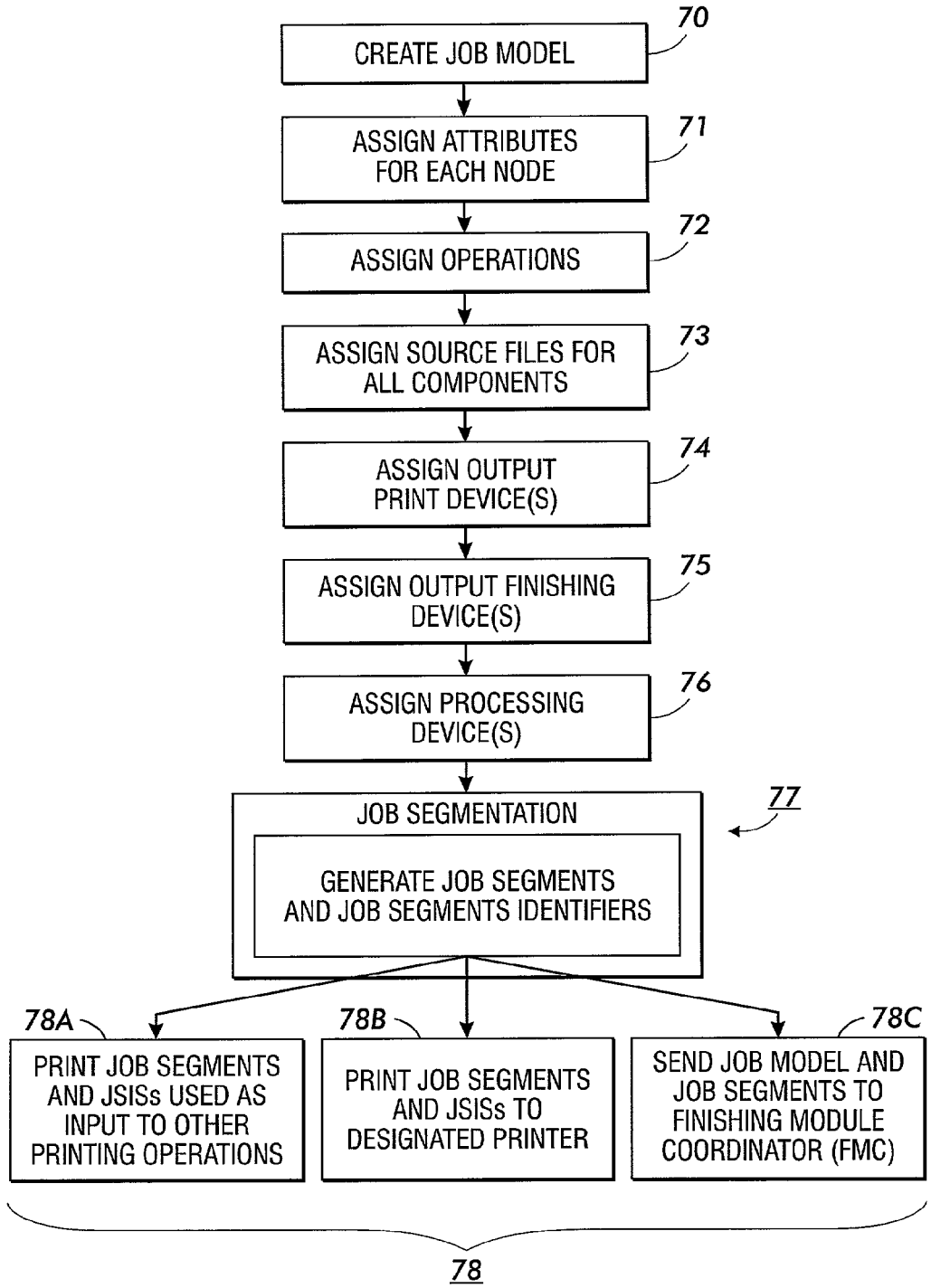

Details of the PMC, shown as Box 100 on FIG. 5, will now be described in relation to FIGS. 8–11. FIG. 8 provides an outline of one embodiment of a logic architecture for the PMC of the present invention. In the embodiment shown in FIG. 8, the capabilities and constraints of the various devices used in a job are used to help plan the job after PDLs or similar content files have been created. Alternative embodiments of the present invention may use data concerning capabilities and constraints to help create PDLs, imposition files, and similar content and layout files.

Each of the steps shown in FIG. 8 will be described in more detail below in relation to FIGS. 9–11. Within FIG. 8, beginning at step 70, a process for creating a job model file is implemented. Construction of a job model using the present invention typically begins after PDL files or other page description, imposition, and similar page content and layout files for the job have been completed. In one embodiment, construction of the job model begins after the job has been laid out using CIP3 or similar job layout format. At step 70, a job model file is opened by assigning at least a job name, a job identifier code, and an identifier code to a file location in a database.

At step 71, attributes are assigned automatically or by the user to each "node" identified in the high level job model received by the PMC. "Node" is defined above to mean each unit of a job arranged within a hierarchy of units, i.e., the job itself, each document within the job, each document component within each document, each stack, sheet, set of sheets, etc. The hierarchy descriptors found in CIP3 can be useful in identifying many of the "nodes" of a job. When used in conjunction with object-oriented software, a "node" may be treated as an "object" that can moved or manipulated by itself or may be opened into subparts that themselves are objects that can be moved or manipulated. At step 71, the identifiable nodes are typically at the job, document, and document component levels.

At step 72, the operations to be performed on each node are identified. Again, CIP3 may be a useful tool for identification of certain operations. Next at step 73, source files for each of the document components are assigned. Next, at step 74, printers that are available to output the job are assigned. At step 75, finisher/assembler devices available for the job are assigned. At step 76, the PMC evaluates whether intermediate finishing operations such as collation should be assigned to printer systems having such capabilities or whether such operations should be performed by non-integrated assembler/finisher equipment. At step 77, the key step of generating job segments occurs. As will be explained in more detail below, job segments for each operation of the job are determined based upon the attributes and operations associated with each document component plus the capabilities and constraints of the various printers and assembler/finishers that may be used for the job. At step 78, various outputs from the PMC are shown. At step 78A, instructions for printing and/or other preparation of an intermediate job segment is shown. An example of such an intermediate job segment might be the initial printing of JSIS or other sheets that will ultimately run through two or more printers. After such JSIC or other intermediate preparation, the initial job segment may be broken apart or combined into different job segments that are appropriate for the next printing or assembler/finisher step. At step 78B, instructions for final printing of each job segment are provided. At step 78C, a copy of the job model and job segment descriptions is sent to the Finishing Module Coordinator (FMC) via the VFJTDB (boxes 700 and 501, respectively, in FIG. 5). For each of steps 78A and B, instructions for creating Job Segment Identifier Sheets (JSIS) or other job segment identifiers associated with each job segment are typically sent. Within step 7C8, copies of the JSIS or other identifiers are typically made directly or indirectly available to the FMC.

Figure 9:
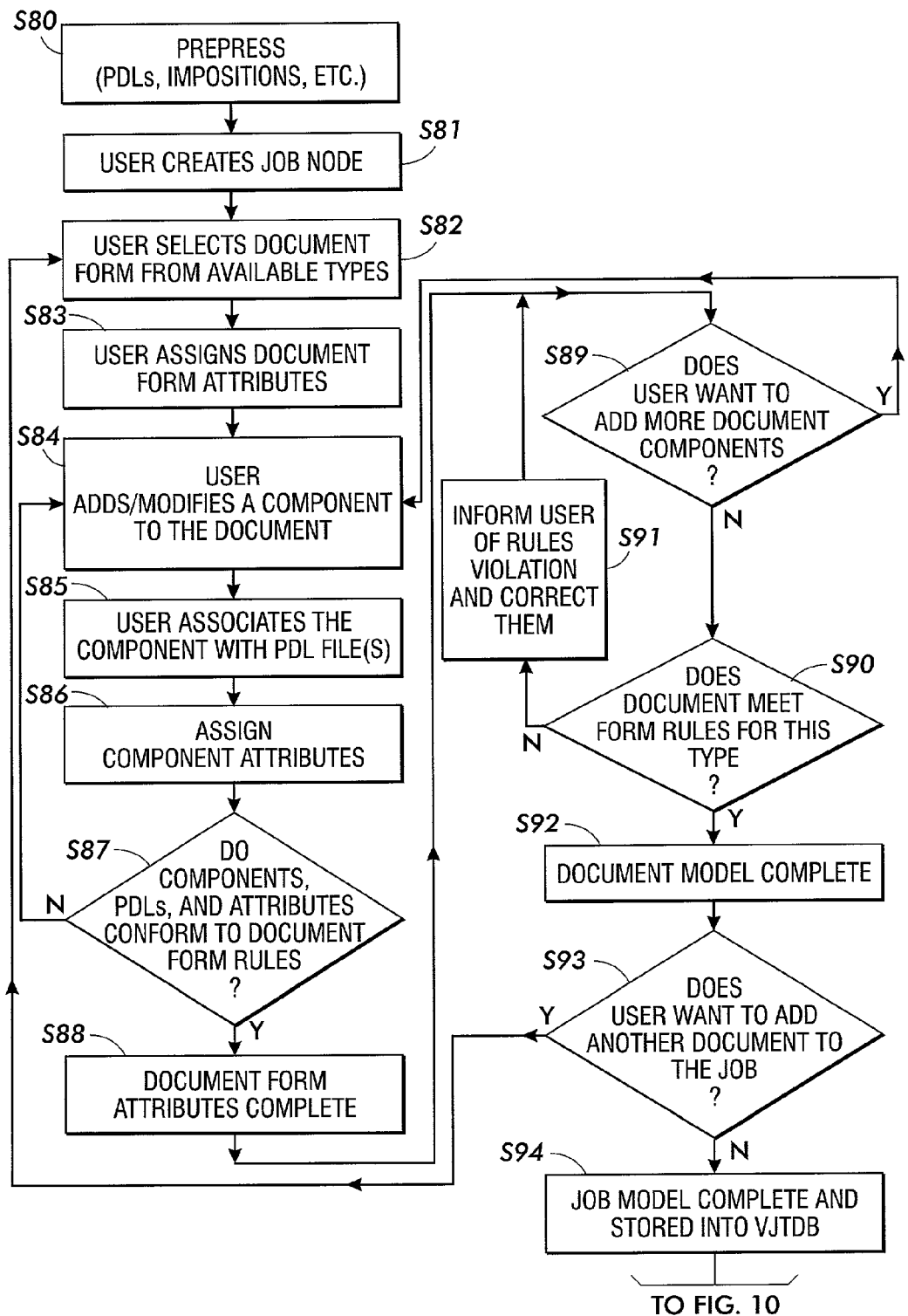
Figure 10:
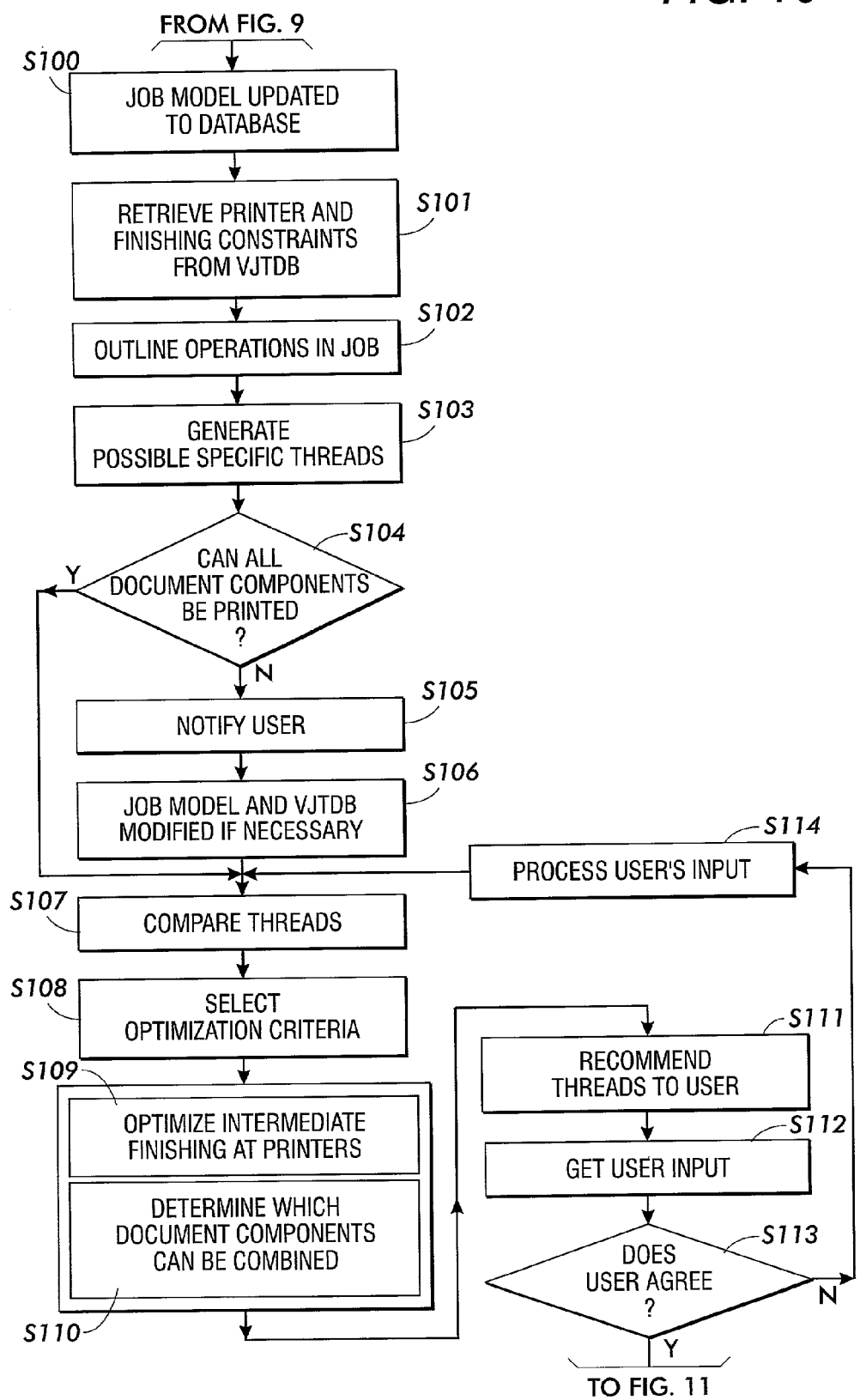
Figure 11:
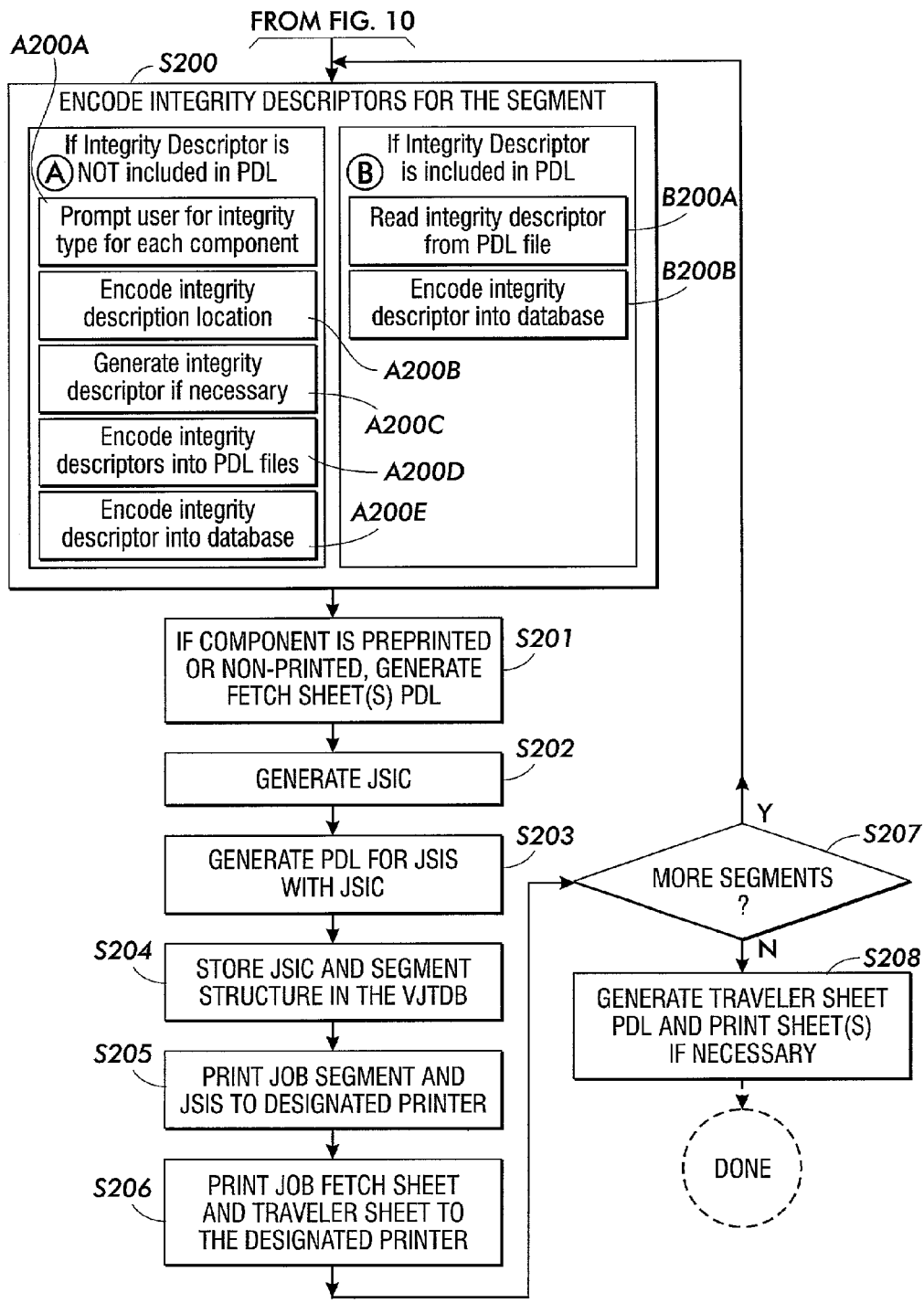

Turning now to FIGS. 9–11, more details are provided for each of steps 70–78 shown in FIG. 8. FIG. 9 shows one embodiment of the portion of the PMC that creates a job model and roughly corresponds to steps 70–73 of FIG. 8. FIG. 10 shows one embodiment of the portion of the PMC that assigns various printer and assembler/finisher devices to implementation of the job and arranges the order of such operations and roughly corresponds to steps 74–76 of FIG.

8. FIG. 11 shows one embodiment of the portion of the PMC that creates job segments for each job and roughly corresponds to steps 77 and 78a–c of FIG. 8.

Turning now to FIG. 9, the sequence begins with step 80 which represents all of the prepress steps involved in the document creation, manipulation and imposition of each sheet of the job. Among the possible outputs from step 80 are the following types of files: PDL files, imposition files such those created by PREPS imposition software available from ScenicSoft, Inc., CIP3 files, files created by DigiPath® production management software available from Xerox Corporation, Word, Powerpoint, Photoshop, and any number of other prepress creation and preparation software. In general, each of these files operate on single sheets or single document components. In step 81, a human operator originates the job creation process by selecting the database in which a job will be stored and, consistent with the rules applicable to such database, assigns or creates a job name and a job number. This data constitutes a job node, and at step 81, such job node is added to the database. At step 82, the user selects a document form from a menu of available document forms and adds this data as a document node entered under the job node file in the database. At step 83, the user adds document form attributes that are selected from a menu of attributes that are specific to the selected document form. These attributes are added to the document node file in the database. At step 84, the user names a document component to be added or modified as a component node filed at the level below the document node in the database. At step 85, the user associates particular PDL or other content files with the component node in the database. Examples of content files include those described above in relation to step 80. At step 86, attributes applicable to each document component are assigned to the applicable document component node. "Attributes" in this context means such descriptors as the type or color of paper, imposition information, and any other descriptive directions pertaining to the processing of that particular document component. At step 87, the PMC checks to confirm that the component descriptors, PDLs, and attributes all conform to "Document Component Form Rules" for the applicable document form. For example, a document component form rule for a signature form may provide that only the center sheet of a signature can be associated with a PDL that covers a 2-up sheet without a gutter in the middle. Document component form rules may also check to ensure that locations of folds occur in gutter regions. If the check in step 87 detects violations of document component form rules, then the operator is notified and the process is returned to step 84. Assuming that no violations are detected, then at step 88, the assignment of attributes to the each document component is deemed complete.

At step 89, the user is asked whether an additional document component will be added to the job. If yes, the user interface returns the user to step 84. If not, the PMC algorithm proceeds to step 90 where a "Document Form Rule" operator compares attributes of all the document components to each other and to a list of attributes that are either specifically permitted or prohibited for components within the selected document form. For instance, if the imposition attributes of the various signatures are not consistent with each other (e.g., the gutters and fold locations are not aligned), then the "Document Form Rule" operator 90 will notify the user at step 91 of a violation of the document form rules and will prevent finalization of the job model until corrected or overridden by the operator. If the document and its document components all conform to their respective Document Form Rules, then the job is passed to step 92, where the document model is deemed complete. If instead a violation of Document Forms Rules is detected, the user is returned to step 89 where he/she is asked to make appropriate corrections via a return to step 84. When a job has been passed to step 92, the user is interrogated, at step 93, whether another document is to be added to the job. If yes, then the user is returned to step 82. If not, processing continues to step 94, where the job model is deemed complete.

Turning now to FIG. 10, the portion of the PMC that selects devices and sequences for implementation of the job is shown. Beginning at step 100, the job model is received from the conclusion of the processes shown in FIG. 9 and is filed in the job database automatically or by user intervention. In one embodiment, the job database is a Virtual Job Ticket Database (VJTDB) comprising both a Virtual Print Job Ticket Database (VPJTDB) and a Virtual Finish Job Ticket Database (VFTDB) as each is defined below. At step 101, a table of printer capabilities and constraints is retrieved from the VJTDB (preferably from the VPJTDB portion of the VJTDB) and a table of finisher/assembler capabilities and constraints is retrieved from the VJTDB (preferably from the VFJTDB portion of the VJTDB). In one embodiment, the VJTDB contains data relating to all applicable devices that can be accessed although the VJTDB may be set up such that it retrieves data for only a sub-set of the total devices for any specified type of job. In addition to allowing certain equipment to be dedicated to certain types of jobs, the above arrangement enables a device that is broken, is in use, or is being serviced to be taken "off line" in relation to a job being processed when such equipment is unavailable. At step 102, the PMC uses all of the job attributes stored in the job model to map all generic combinations and sequences for printing, assembling, and finishing that could result in creation of the finished document, i.e., B&W printing, collating, folding, gathering, etc. Each of these combinations and sequences shall be referred to as a "thread". At step 103, the PMC uses the retrieved lists of all of the capabilities and constraints of the devices described in the VJTDB to generate a list of all possible specific paths, or threads, by which the retrieved devices can implement the operations and attributes identified in the job model. In this manner, the generic threads such as shown in FIG. 4 are mapped onto various paths or threads comprising specifically identified equipment and sequences. Importantly, the PMC uses the list of constraints within step 103 to determine various job segments that may be required when processing the job. For instance, if a particular thread encounters a bin height constraint of 2.2 inches from one of the devices in the thread, then the portion of the job that flows through that thread will be mapped in job segments that will all fit within the 2.2 inch bin constraint. In effect, job segments for each thread or portion thereof are defined by the combined constraints derived from every device in the thread. Where appropriate to provide additional flexibility, job segments may be broken apart into their constituent document components after leaving a device and recombined into different job segments for processing during one or more following operations. At step 104, the PMC examines the job model and each of its nodes to ensure that all document components of the job can be mapped onto specific threads that all conform to the constraints of the various equipment and can be operated without unresolvable conflicts. If every document component can be specifically mapped in such manner, then the PMC proceeds directly to step 107. If not, then, at step 105, the user is informed of the document components that cannot be specifically mapped and is given the opportunity either (1) to make additional equipment listed in the VJTDB available for this job or (2) to return to the steps shown in FIG. 9 in order to modify one or more document components. At step 106, the job model is modified in the event that document components are modified. The VJTDB list of available equipment is also modified where appropriate.

Figure 12:
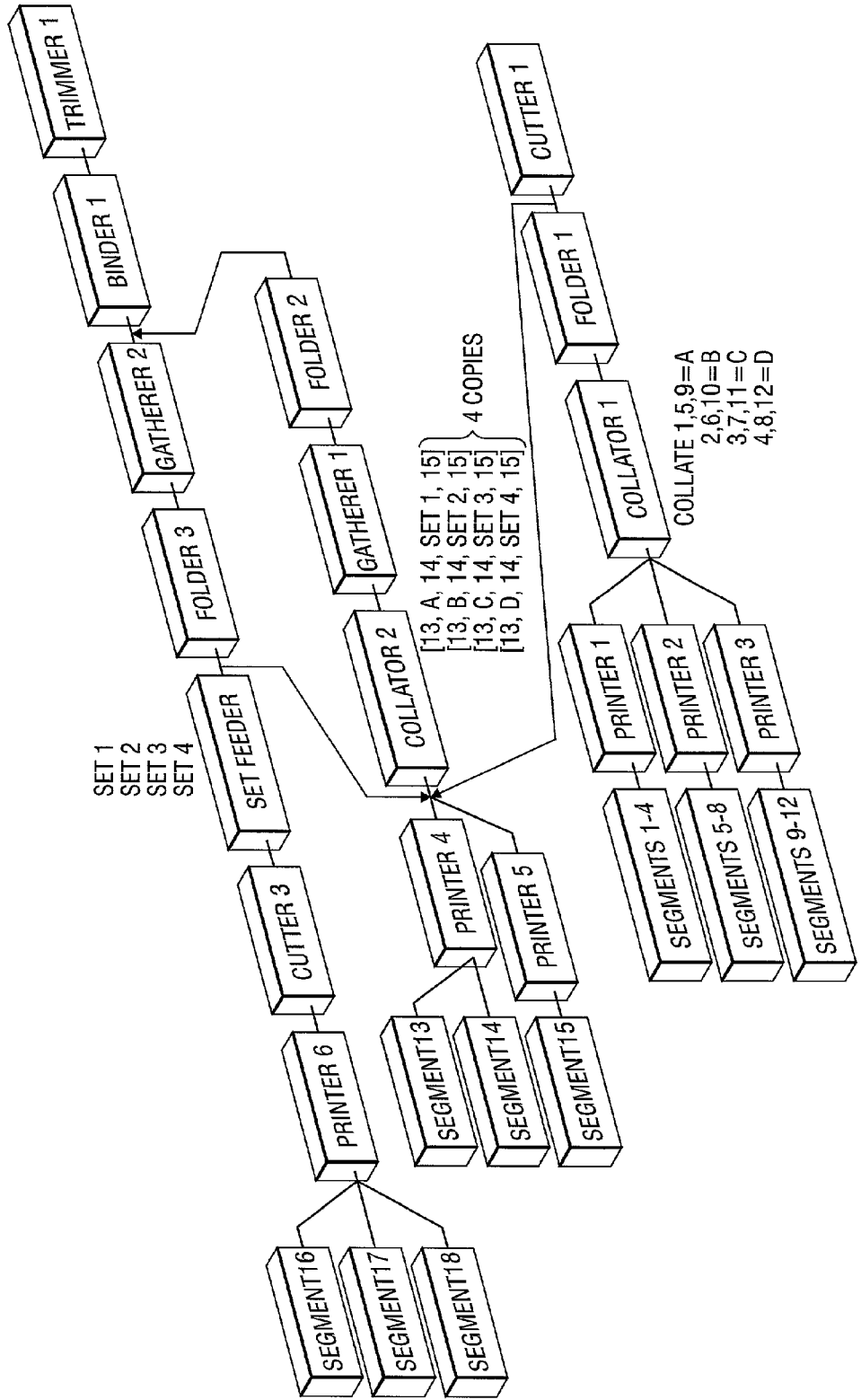

At steps 107–110, the various possible threads are matched and compared in order to eliminate or minimize equipment utilization conflicts and to determine the optimal selection of threads for implementation of the job. The optimization process can be accomplished by any number of algorithms that provide values for the various devices and evaluation criteria for determining preferences. For instance, if optimization is to be determined on the basis of the shortest time for completion of the job, then a possible algorithm for such optimization would assign a time period for each operation performed by each device on each sheet or job segment that flows through the thread. The sums of all time periods attributable to each thread would then be computed, and the combination of threads that results in the shortest production time would be selected as the optimal mapping of threads. Similarly, optimization algorithms and VJTDB data can be established for optimizing the estimated cost of a job, for optimizing or minimizing the use of a specific device, for any similar priority goal, or for any combination of optimization goals. Step 109 indicates a particular portion of the optimization process wherein the intermediate finishing capabilities of the various printers within the threads are compared and optimized. For instance, if a printer can print two separate document components in collated, non-collated, or collated set form, these three possibilities comprise three different possible threads requiring different assembler/finishing operations. These different threads may then be compared for optimization purposes. Such different threads may be created whenever printers are capable of multiple output or finishing options. At step 110, another aspect of the optimization process is determining which, if any, document components can usefully be combined into a single job segment during a printer and/or finishing operation and to thereby be treated as a single node having two subparts. For instance, if two monochrome document components identified as A and B can be printed by the same printer, one thread may exist that treats these as a combined job segment that outputs the document components in collated, offset, stacked form: A,B; A,B; A,B; etc. If the subparts A and B will subsequently be separated, they may also be offset within their respective sets. Once separated, the thread may provide that document components A and B are recombined with other document segments to form new job segments applicable for the subsequent assembler/finisher operations. At the conclusion of steps 107–110, the PMC at step 111 presents to the user a recommendation for the optimal selection of threads, including information if desired of job segments, estimated time, estimated cost, etc. In one embodiment indicated by FIG. 12, the threads are presented to the user in a GUI showing (1) a perspective view of a three-dimensional representation of all devices available for the job, (2) a map that shows the thread that each job segment would take through the devices, and (3) such data as the number and sequences of the various job segments required to complete the job. Such a three-dimensional representation the job flow is preferably made available to the user both during planning of the job as shown in FIG. 9 and as a means for tracking the job during actual production.

At steps 112–114, the user is prompted to review and approve the recommended threads prepared by the PMC. If accepted, the job goes to the integrity and tracking features of the PMC that are shown in FIG. 11. If not accepted at step 113, the user in step 114 is given the option to select a map of different threads than the recommended threads, in which case the PMC is returned to step 108. Alternatively, the user may elect to design additional threads by adding devices to the list of available equipment, by modifying the constraints of available equipment (e.g. moving bin positions to change stack height constraints), by manually creating different job segments consistent with device constraints, or by similar manual override methods. Also in this step, equipment that is unavailable due to prior use or need for service may be returned to an available state by user intervention or passage of time. The user may also use this opportunity to return to the job model processes shown in FIG. 9 in order to modify one or more document components within the job (e.g., select a different lamination material in order to use a laminator device with a different temperature constraint). When the user accepts the map of threads resulting from the processes shown in FIG. 10, the job is referred to the PMC processes shown in FIG. 11.

FIG. 11 commences with receipt of the job segmentation and map information from the processes shown in FIG. 10. At step 200, an integrity descriptor is encoded for each document component within a job segment that has been determined and accepted pursuant to the processes shown in FIG. 10. Such integrity descriptor contains, for each document component, such information as the number of sheets within the document component, the number of copies to be printed, and such other information that will be useful in tracking the job and in determining whether each operation has been completed with respect to each sheet of the job segment. Step 200 contains two separate paths, each comprising several sub-steps. Path A applies if the PDL file for a particular sheet or document component arrives at the PMC without a previously created integrity descriptor. At step A200A, a user is prompted to define the type of integrity descriptor applicable to each document component, including the attribute or parameters contained within such integrity descriptor. Such definition may provide the PMC with a fixed descriptor, provide for a range of descriptor values, or may direct the PMC to derive an IDC from a database on file. At step A200B, the location where the integrity descriptor will be stored is selected. At step A200C, the PMC uses the information provided by the user in step A200A and the location identified in step A200B to generate a new integrity descriptor if none is provided by the user in step A200A. At step A200D, the integrity descriptor itself or an Integrity Descriptor Code (IDC) is added to the applicable PDL files. An IDC comprises a pointer to the location where the integrity descriptor is stored. At step A200E, the integrity descriptor or IDC is added to the appropriate node or nodes in the job database file. Preferably, as discussed above, this is a VJTDB comprising both a VPJTDB and a VFJTDB.

Alternatively, column B of step 200 describes the processes applicable when an integrity descriptor is created before the PDL files are delivered to the PMC. At step B200A, the integrity descriptor is read from the PDL file. At step B200B, the integrity descriptor is encoded into the VJTDB or other database.

At step 201, the PMC uses the job model to determine if the document component comprises preprinted or non-printed sheets or other items that must be added to the workflow from inventory in order to complete the job. Among the items that may be noted are separator sheets, binder materials, preprinted pictorial inserts, perfume-containing scent cards, and similar items that are not printed as part of the current job. Since stacks of such inventory materials typically do not have a traveler sheet prepared for this job, the PMC at step 201 generates a Fetch Sheet PDL and directs its printing if necessary.

At step 202, the Job Segment Identifier Code (JSIC) for the job segment is generated. The JSIC is a unique identifier code that enables the FMC in phase 3 to lookup a description of the job segment within the VFJTDB. A JSIC may be generated by combining a job number with a sequentially generated number that represents the stack number within the job. More details concerning the JSIC and its use are provided below. At step 203, the PMC directs the generation of a PDL file for printing of a Job Segment Identification Sheet (JSIS) if required. The JSIS will contain the JSIC, a human readable instruction sheet for processing of the job taken from the job model, and lists of document and document component attributes. It should be noted, however, that in systems where the identity of a job segment can be determined or tracked without the printing of a JSIS, then some or all of step 203 may be eliminated. For instance, where the contents of the top sheet of a stack can be automatically read by a VJTR and matched against a database of expected top sheets, the FMC then could identify and track the job segment by reading such top sheet as it moves through the various production phases without the need for a special JSIS or even special JSIC on the top sheet, i.e., the contents of the top sheet itself would form a JSI.

At step 204, the PMC stores the JSIC, the job segmentation, and the selected job segment thread information in the VJTDB. At step 205, the PDL files covering a JSIS, if any, is added to the PDLs and other files required for printing of the applicable job segment and such files are delivered to such printer for printing, phase 2 of the printing production process is thereby commenced. At step 206, fetch sheets for the job are also sent to appropriate printers in order that they be available to the human operators as the job is produced. At step 207, the PMC determines whether the job has additional job segments to process. If yes, then steps 200–206 are repeated again for each job segment. Once processing of all job segments has been completed, then at step 208, the PMC directs creation of a traveler sheet PDL and its printing in order that all of the information required to produce and process the job and each of its job segments and/or document components is placed in human readable form for the human operators. Such traveler sheets typically stay with the job jacket as it moves around the print shop.

Figure 13:
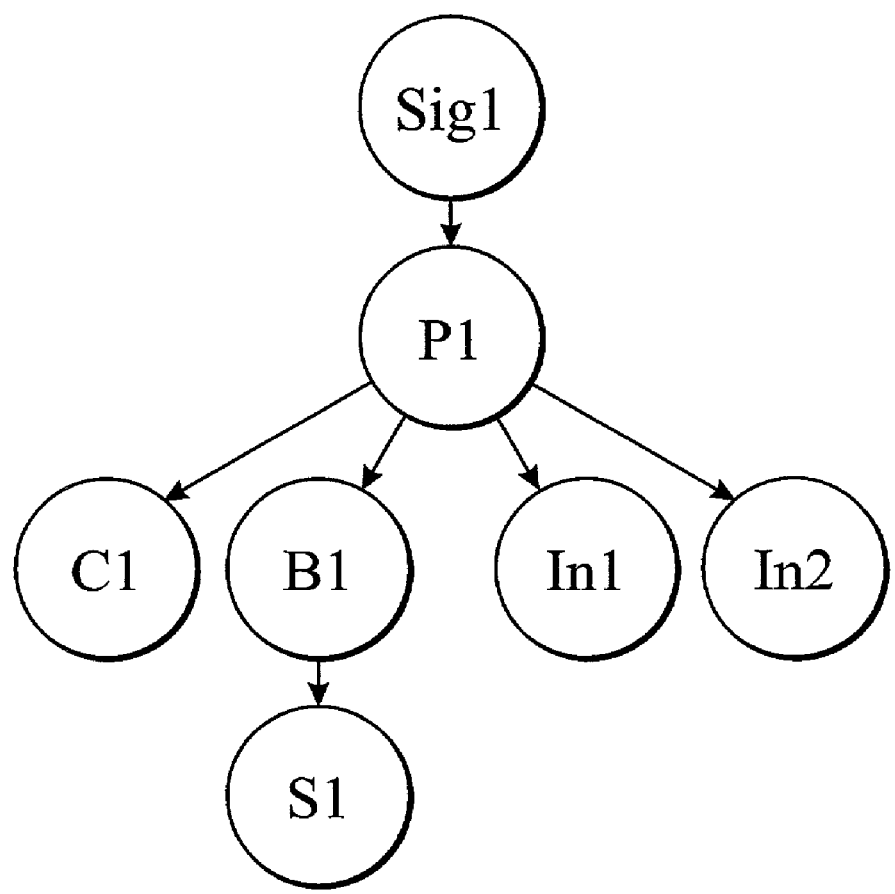

More details concerning the VJTDB will now be discussed in relation to FIG. 13. In particular, the VFJTDB portion of the VJTDB will be described in more detail. As described above, the VFJTDB is a database or a data file that contains all job construction, control and integrity data necessary to take the prints coming from the printing device (s) and perform the necessary finishing processes to turn the prints into the desired final document form. As such, one portion of the VFJTDB or other accessible database contains tables or lists of all devices accessible for operations occurring printing of sheets has occurred, including, without limitation, the availability and priority parameters for each device and lists of capabilities and constraints for each device. Another portion of the VFJTDB contains data pertaining to each particular job.

The job description portion of the VFJTDB is best understood as a database having a hierarchical tree structure with each level of the tree having one or more discrete nodes. FIG. 13 shows such a tree structure as it may apply to production for a signature document. The top level Sig1 represents the basic job description. Encoded within this node are such details as job name and number, the node identifier (in this case, Sig1). information concerning the client, accounting and billing information, scheduling data such as date of order and scheduled production and delivery dates, etc. These and other details are the "attributes" associated with node Sig1 and may be stored in table form within the node itself or may be associated by reference pointers within Sig1 to external databases. Also within node Sig1 is typically a reference pointer to any "parent" nodes and to the nodes in the level immediately below Sig1. Such reference pointers to nodes immediately above and below a particular node is a characteristic at all levels of this embodiment of the VFJTDB. By following the trail of such pointers, an entire job can be reassembled if such one node is identified.

On the next level below Sig1 is node P1 which is the node containing descriptors for a particular document to be produced as part of Job Sig1. There is no limit to the number of documents that may be stored under a particular job, and nodes P2, P3, etc. could exist. Turning now to node P1, such top level document node contains an identifier of the document form governing the document. By designating such document form, a table of attributes for such document form and a set of Document Form Rules are associated with P1, and these rules and attributes will be used by the PMC when mapping production of the job. As noted above, node P1 also identifies each of its children nodes. An important aspect is that each node P1 contains information detailing the order and manner in which each of the children nodes relate to each other, e.g. cover C1 is identified as the document component that will ultimately be on the outside of the document. Since the example shown in FIG. 13 is a signature booklet, the relationship between the children of P1 can be specified by the order in which each document component is added to the gathered signature stack prior to its folding and/or binding, as the case may be. Also contained or referenced in node P1 is a job model register in which the PMC may store data describing threads relating to production of the job. When filled, such register will ultimately contain such detailed information as a "Build Sequence" for document P1. An example of a Build Sequence for the shown job might be:

1. Feed 1 sheet of job segment C1 from Bin #1 of Printer #4 and place the sheet in Bin # 6 of Assembler/Finisher #2.
2. Feed a first offset set (comprising one document component within a job segment stack) from job segment B1 located at Bin #1 of Set Feeder #1 and place the set on top in Bin #6 of A/F #2.
3. Feed job segment I1 (which comprises an insert) from Bin #20 of inventory delivery system #1, re-orient the set by a 90 degree rotation, and place insert I1 on top in Bin #6 of A/F #2.
4. Feed a second offset set (comprising a second document component within a job segment stack) from job segment B1 and place the second set on top in Bin #6 of A/F #2.
5. Feed job segment 12 (which comprises a second insert) from Bin #5 of inventory delivery system #1 and place insert 12 on top in bin #6 of A/F #2.

The job model register will also contain information, conforming to the applicable Document Form Rules, for programming A/F #6 to perform all of the scoring, folding, stitching, trimming, etc. operations that will result in final production of the signature booklet described in node P1. Among the typical parameters encoded for such operations will be the identity of the operation and the location for its operation on the work piece, the type and temperature of any lamination step, any pressure requirements for scoring, folding, binding, etc., the type and location of binding, etc.

Each node at the level below node P1 will contain information relevant to the job segment represented by such node. Such information will include the printer and bins from which such segment is derived, the number of sets or sheets in the job segment, its current location, attributes of the segment such as whether it is collated or not collated, face up or face down, orientation, sheet weight, color, type and thickness, etc. Of particular note in the shown example is node B1 which comprises a single job segment of two collated document components arranged in interleaved offset sets. Each of these document components may be described in their own separate nodes as indicated by node S1. There is no limit to the number of nodes or levels of nodes in the present invention. In the event that each of the document components represented in B1 were sourced from separate printers, then each would comprise a separate job segment with a separate node which then became combined into a new job segment at node B1. Note that when delivered from node B1, the job segment stack was disassembled and its components were rearranged into a new job segment P1. Obviously, for complex books comprising many signatures, inserts, covers, etc. many nodes and levels of nodes would be represented in the VFJTDB.

Figure 14:
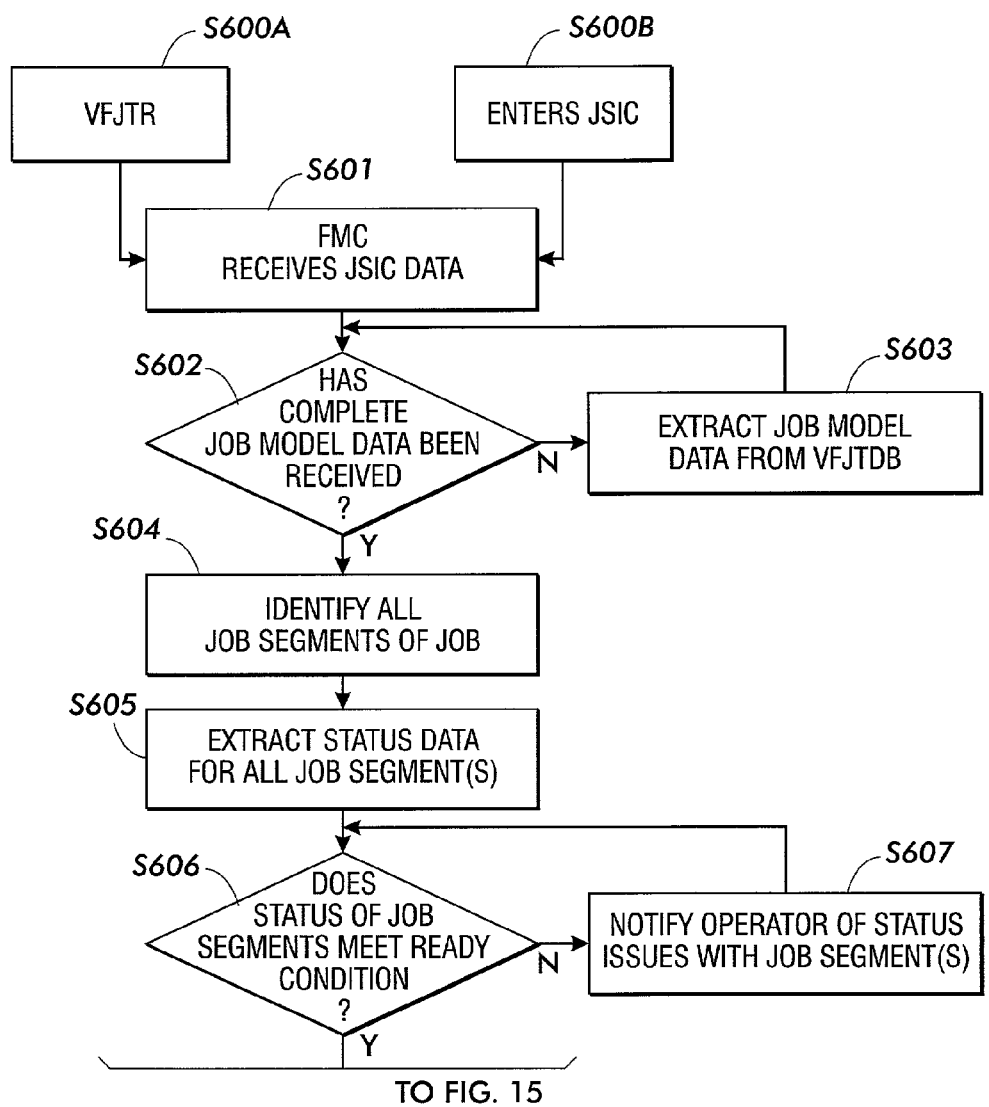

Turning now to FIG. 14, more details are provided concerning the Finishing Module Controller (FMC) shown as box 700 in FIG. 5. Beginning at step 600 of FIG. 14, two methods of entering the JSIC for each job segment is shown. In step 600A, the VFJTR reads the JSIS or other JSI from a job segment of the job. As described above, the VFJTR may read a bar coded JSIC, a glyph code, optical characters with an OCR, magnetic or optical memory, or any other encoding or symbology which a machine is capable of interpreting. Alternatively to step 600A, step 600B indicates that the JSIC could be read and entered by a human operator. At step 601, the FMC receives the JSIC data from the VFJTR or human operator. At step 602, the FMC queries whether the data received comprises all of the job model data for the job. As described above, a complete set of job-related data could be encoded by a glyph or other method on each JSIS of the job. Region 602 of the VFJT shown in FIG. 7 contained such information. If the FMC has not received a complete job model from the operator or from the VFJTR, then the FMC at step 603 makes a call upon the VFJTDB for a complete set of the relevant job model data. In order to do so, the FMC communicates the relevant JSIC to the controller for the VFJTDB (which may be the PMC or the FMC or other controller) in order that the VFJTDB may locate the identified job segment node. Using data recorded within this node, as described above in relation to the VFJTDB, a complete job model and information from every node of the job can be extracted from the VFJTDB. At the conclusion of step 603, processing returns to step 602 where the FMC again inquires whether it has received a complete set of job model data. Once this query is satisfied, then, at step 604, the FMC reads the job model data to identify all job segments of the job. Since even job segments comprising identical sheets have unique JSICs, a complete list of all JSICs provides the FMC with the complete job flow, i.e., not only a description of how to build a single finished product but also a list of all of the job segments that will "flow" through the assembler/finisher process to build all of the products. See also FIG. 12 for an indicator of the data available to track both individual product units and the entire production process for all sub-units. At step 605, the FMC extracts from the VFJTDB or other database data concerning the location and status of all of the job segments identified for the job. In a continuous printing operation, some of the job segments may yet wait processing1 within the printers, and this status is communicated to the FMC. At step 606, the FMC determines, based upon the job model data, whether all or a sufficient quantity of the job segments are ready and available for the assembler/finisher operations. If not, then at step 607 the FMC notifies the human operator and waits for further instruction. If yes, then the FMC has determined that the work pieces are ready for assembling and finishing operations.

Figure 15:
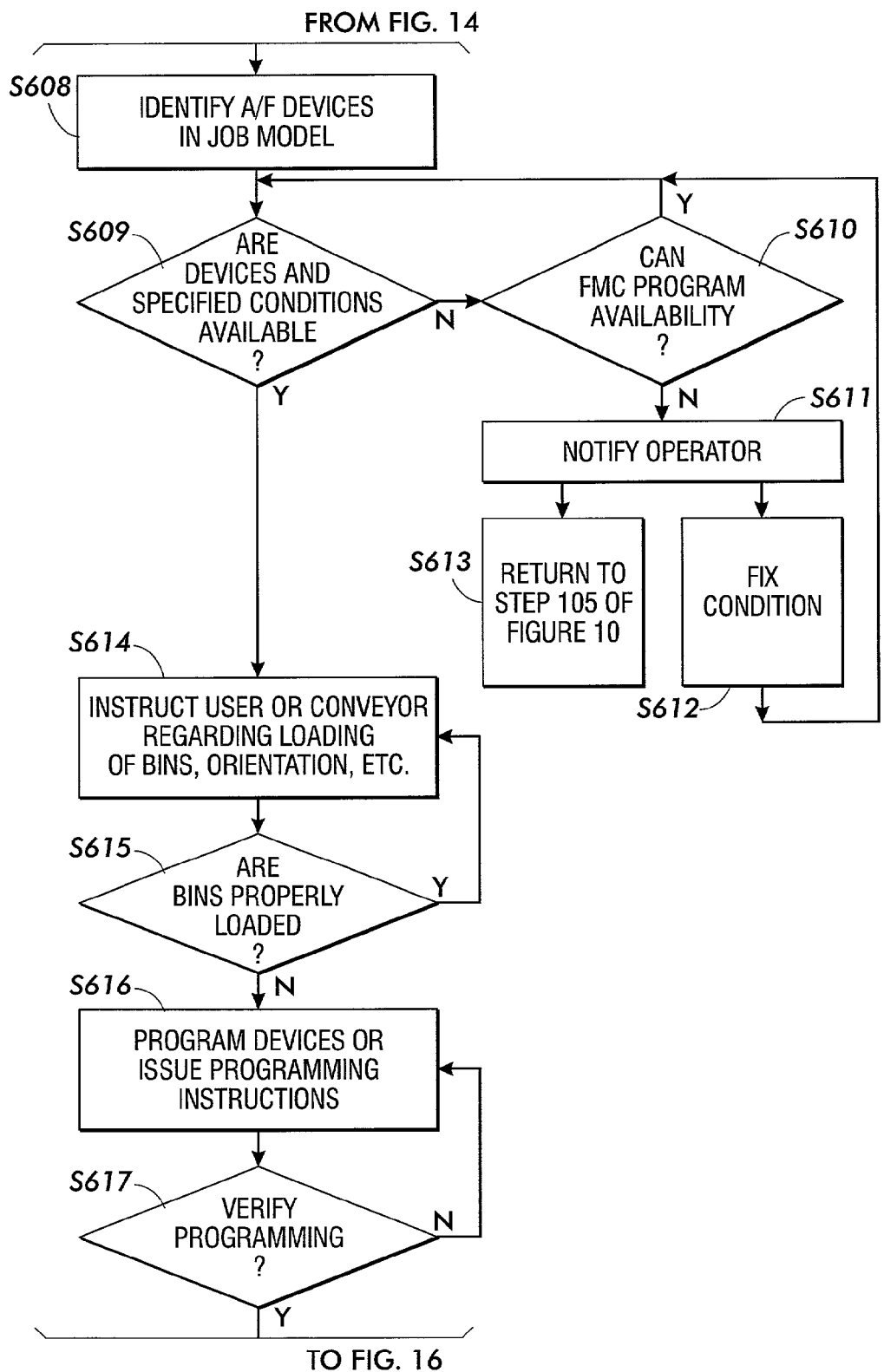
Figure 16:
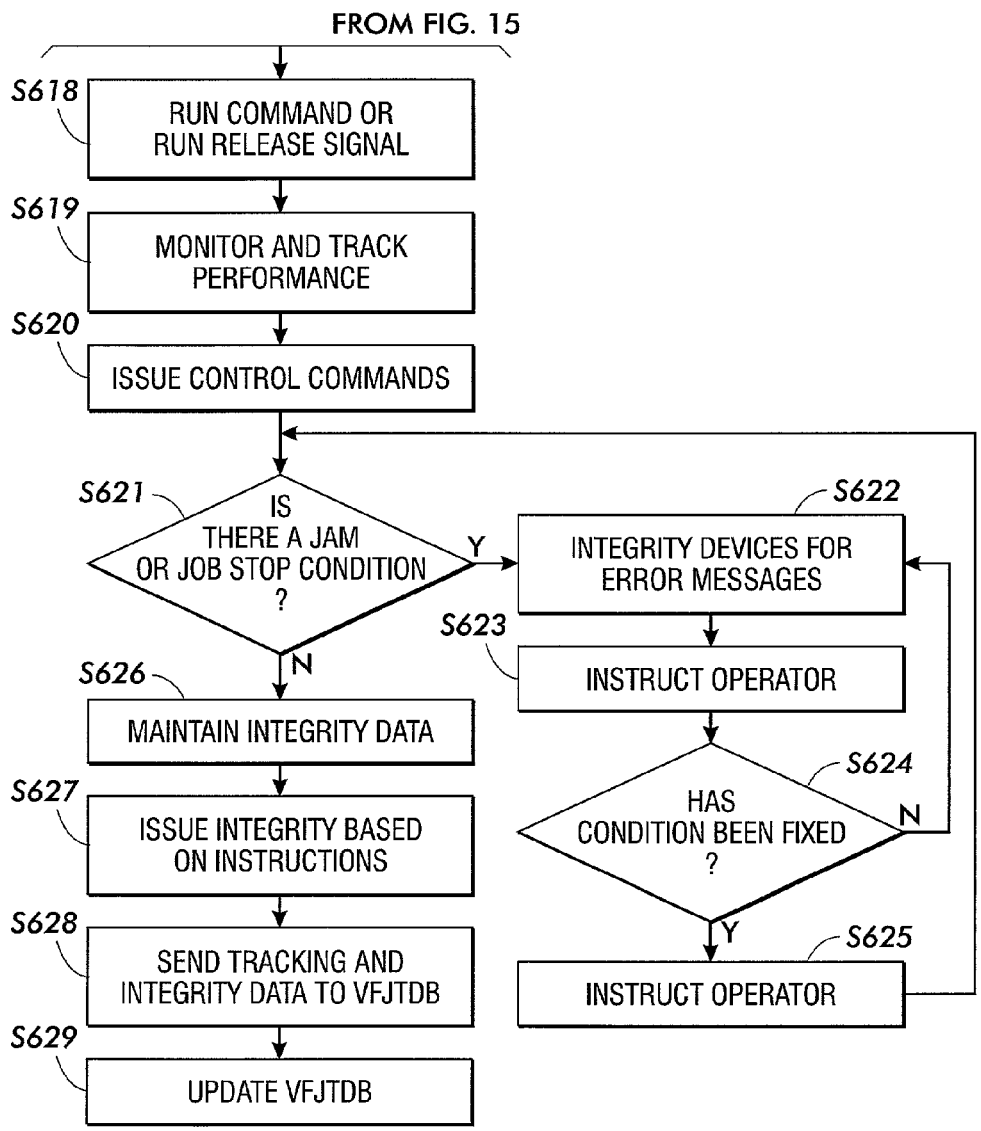
Figure 17:
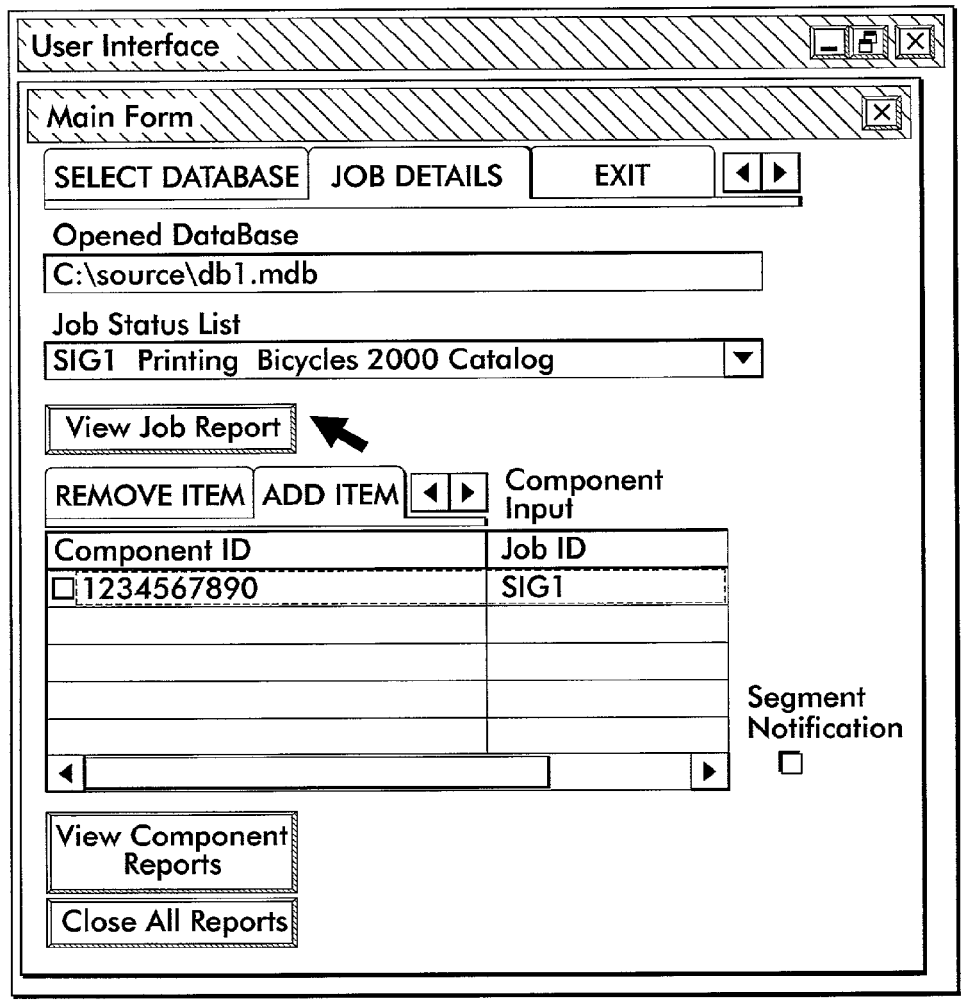
Figure 18:
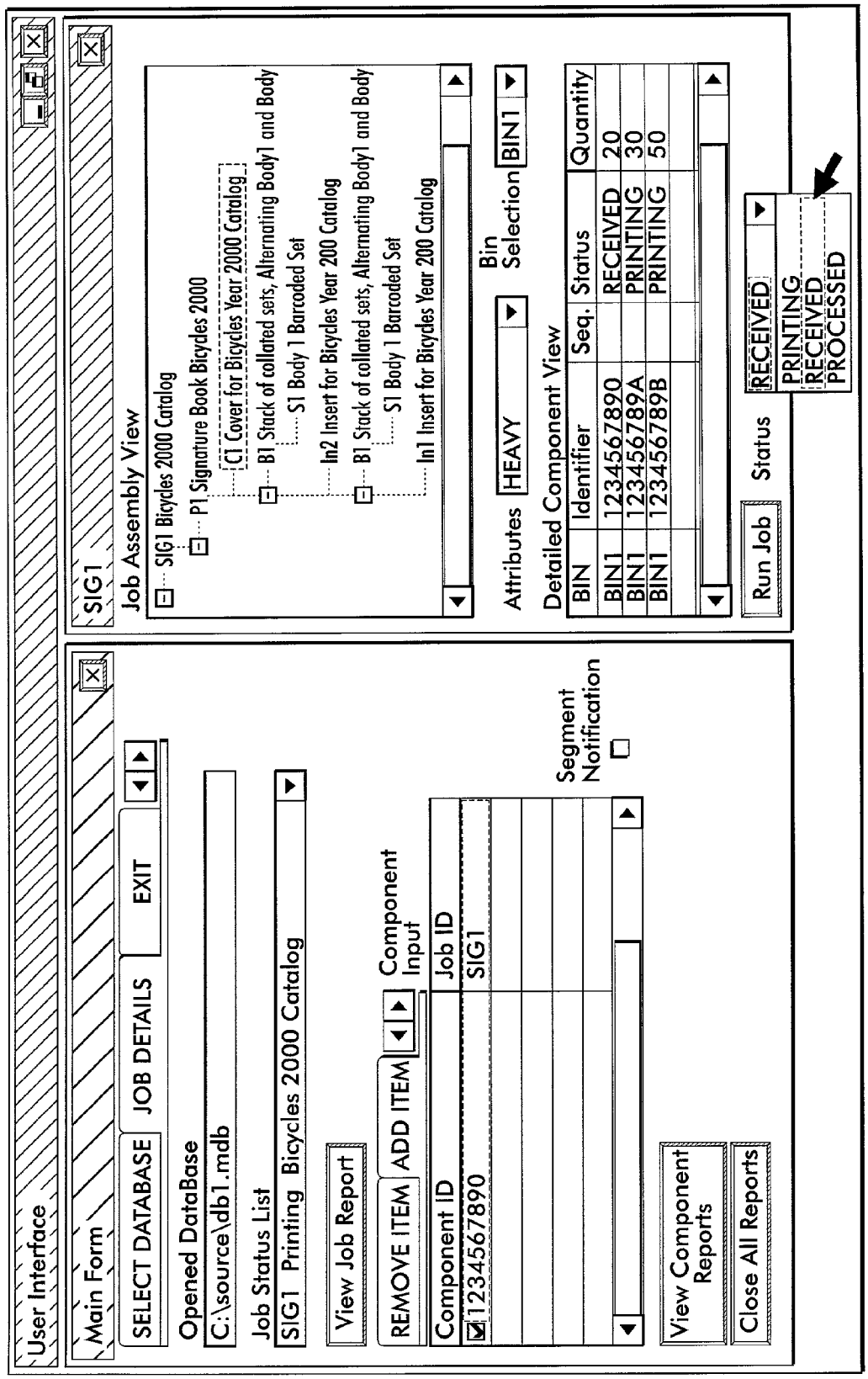
Figure 19:
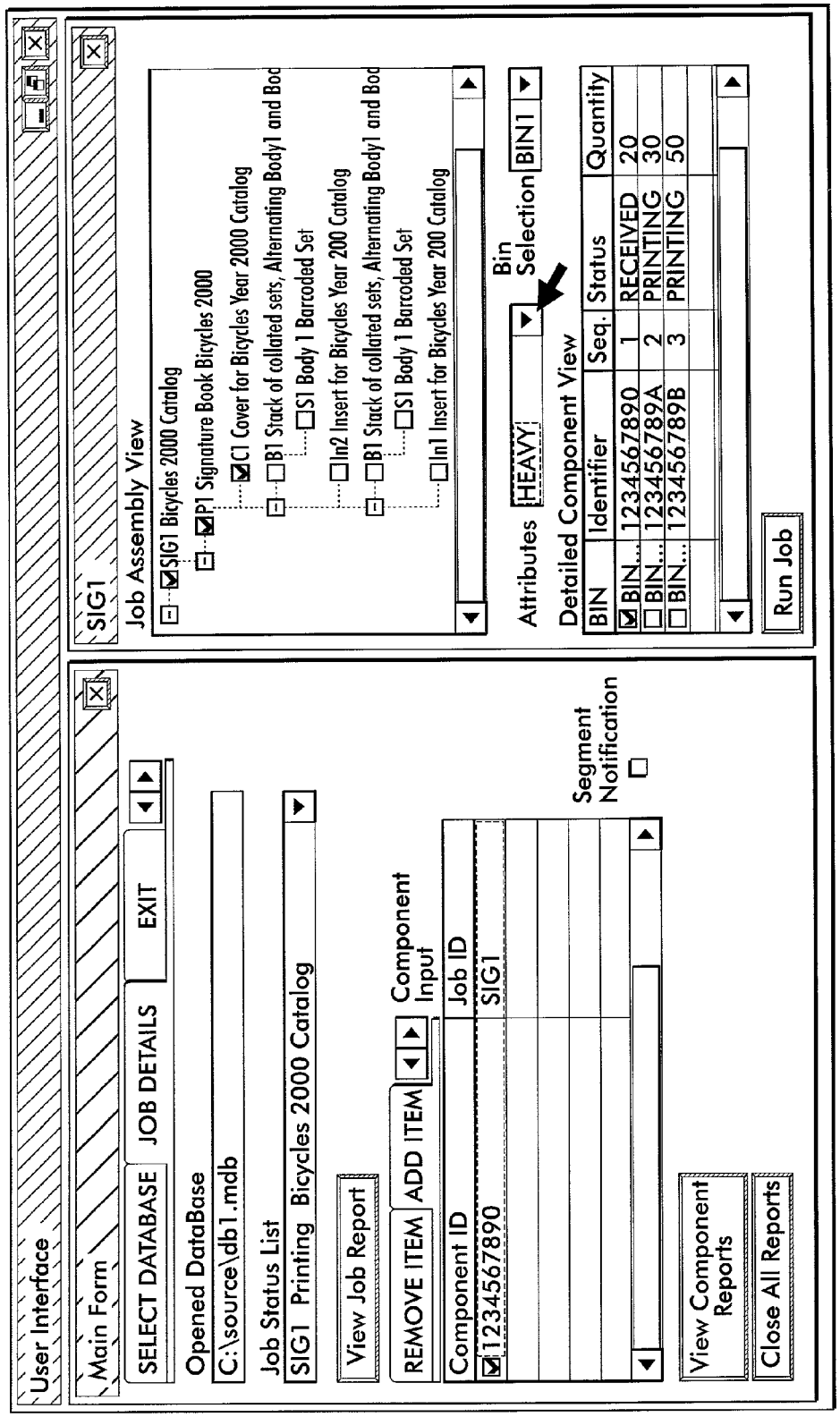
Figure 20:
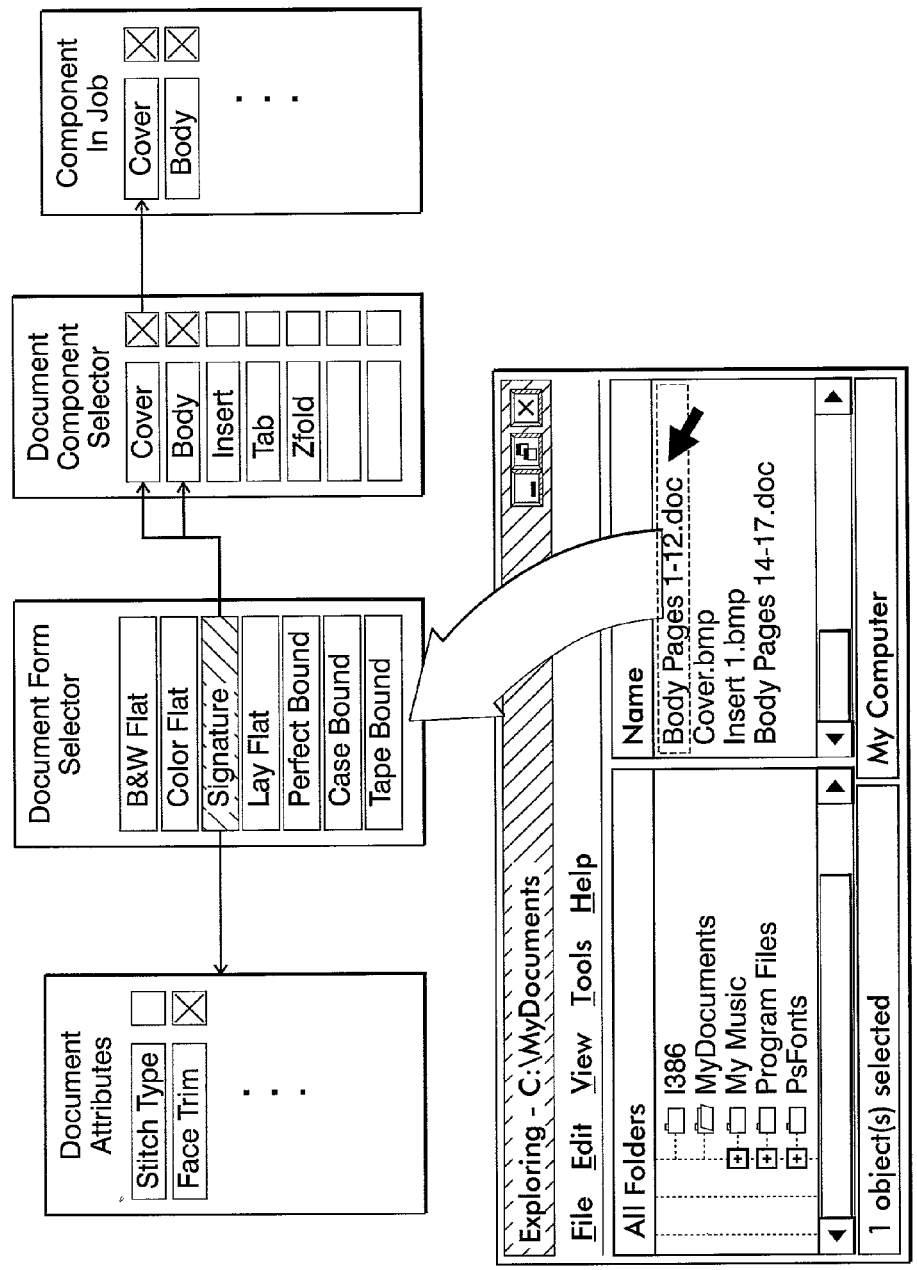

The FMC begins its investigation of equipment readiness at step 608. At step 608, the FMC identifies from the job model each device necessary for the next set of finishing operations. In most cases, assembler/finishing operations will be designed to produce finished products in a continuous assembler/finisher process. Where the assembler/finisher process may conveniently be broken into non-continuous phases, however, the FMC need only identify the assembler/finisher devices necessary for the next phase of operations. Also as part of step 608, the FMC extracts from the job model any device configuration attributes that the job model requires in order for the job to be implemented. For example, if an assembler device permits different input bin configurations and the job model specifies a specific configuration, then this data would be extracted from the job model. Similarly, if paper path guides or scoring and folding apparatus, etc. need to be in specified locations that are not adjustable through automatic programming, such attributes are identified through the job model. At step 609, the FMC interrogates the listed devices to determine whether they and the specified configurations are available for processing of the job. The interface between the FMC and the assembler/finisher devices may take many forms. One such interface protocol is the Modular Feeding and Finishing Architecture (MFFA) of the Xerox Corporation. The MFFA is described in the following U.S. Pat. No. 5,701,557 issued to Webster, et. al.; U.S. Pat. No. 5,631,740 issued to Webster, et. al.; U.S. Pat. No. 5,617,215 issued to Webster et al.; U.S. Pat. No. 5,604,600 issued to Webster; U.S. Pat. No. 5,559,606 issued to Webster et al.; U.S. Pat. No. 5,363,175 issued to Matysek; U.S. Pat. No. 5,682,247 issued to Webster et al. If the devices and configurations are not currently available, the FMC inquires, at step 610, whether the MFFA or other interface protocol combined with the programmability of the device enables the FMC to program the applicable devices to make each device and its specified configuration available. If yes, then the FMC returns to step 609. If not, then at step 611, the user is notified. If the user can and chooses to place the devices in the desired status, then step 612 indicates that the user implements these changes. Once implemented, the user signals that the changes have been made, and the process returns to step 609. If the user cannot or elects not to make the required changes, then the job is paused unless the user elects to create a different job model using different threads that avoid the constrained condition. To do so, at step 613, the user returns the process to step 105 shown on FIG. 10 where new threads are created. New job segments may also be recommended since a different set of constraints may be encountered. As part of creating new threads, the unavailable device or configuration would be removed from the VFJTDB list of available equipment. It is important to note that although FIG. 15 indicates that the process is returned to the PMC for this task, the task of could also be completed within the FMC. As indicated in FIG. 5, whichever of the PMC or the FMC implement this task, the results are communicated and stored in the job model portion of the VFJTDB and are available to the other controller.

Once it is determined, at step 609, that the required devices and configurations are available for the job model first selected or for a subsequent revised job model, then the FMC proceeds, at step 614, to specifically define where and how the various job segments are to be loaded into each of the devices selected for use. Some of this information may have been determined by the PMC processes described in relation to FIGS. 8–11. However, details such as bin selection and specific orientation (face up, face down; binding edge first or last, etc.) may not have been selected during phase 1 of the job in order that the greatest flexibility be preserved until the FMC is invoked to implement specific threads and configurations for assembler/finisher operations. At step 615, the FMC verifies, through communication with the assembler/finisher devices, all bins that should be loaded are in fact loaded properly. Instructions are reissued if needed. Assuming that all bins have been properly loaded, then, at step 616, the FMC automatically programs devices that are automatically programmable to operate in accordance with the job model. Programming instructions may include, where appropriate, parameters computed by the FMC itself from capability and constraint data extracted from the VFJTDB. For instance, the FMC may determine feed rates for a device based upon the constraints of another device operating in conjunction with the first device. For those devices that are not automatically programmable by the FMC, the FMC instructs the operator concerning such programming. Such instruction set may take the form of a printed JSIS. Once proper programming is verified at step 617, the set-up portion of the FMC function is over.

Beginning at step 618, the control, tracking and integrity functions of the FMC begin. At 618, the FMC issues a Run Command to start the assembler/finisher processes. Alternatively, the FMC issues a Run Release signal to the operator that notifies the operator the assembler/finisher devices are in a ready condition. Once operations are initiated, the FMC, at step 619, monitors and tracks performance of the job and at step 620, issues appropriate control commands in response to tracking and performance data. Part of the tracking function uses the sheet counting capabilities of various devices to count sheets. The FMC similarly may track each job segment by its JSI as it moves through the process. In so doing, the FMC may issue calls for job segments to be loaded into devices in sequential order, e.g., issue orders to refill bins even before "bin empty" signals are generated or orders to empty bins filled with completed products or job segments. The FMC may also be in contact with performance of each device and may issue commands to adjust feed rates in order to maintain feed sequences within optimal ranges. The FMC may also monitor consumption of supplies such as binding materials and issue calls for reloading of such supplies when appropriate.

Integrity and control functions are indicated at steps 621–625. At step 621, the assembler/finishers are programmed to send to the FMC jam or job stop notices. The FMC then coordinates appropriate pauses in other devices dependent upon the jammed or stopped device. At step 622, the FMC interrogates the stopped or jammed device for error analyses. At 623, the FMC issues instructions to the operator. These instructions may as simple as informing the operator which device is the cause of the problem or might be as complex as providing full recovery instructions. At 624, the FMC verifies whether the jam or stop conditions have been removed. If not, then the sequence returns to step 622. If the conditions have been removed, then the FMC at 625 issues restart commands which may include reloading and reconfiguration commands to the operator and/or devices. Once restarted, the FMC returns to step 621 where the process continues.

At step 626, the FMC maintains integrity data. Based upon count data and job segment status data obtained in steps 619 and 620 plus the stop and jam recovery data from steps 621–625, the FMC tracks which sheets have been lost, destroyed, or are unaccounted for during the assembler/finisher process. The FMC also tracks which job segments or finished products may contain missing sheets based upon the counting and tracking data. Based upon this integrity data, at step 627, the FMC issues instructions for additional printing and/or assembler/finisher operations. These instructions could be automatic to the appropriate devices or may be instructions to the operator regarding manual reprogramming of certain portions of the job. One advantage of having an FMC that is capable of tracking even complex jobs through all parts of the assembler/finisher operation is that there is less incentive to print extra copies of each document component, thereby saving printing and inventory cost. The lowered incentives result because the FMC's ability to track job segments and sheets within job segments enables operators to more precisely know when and where defects have occurred.

At step 628, the FMC sends its tracking and integrity data to a central database such as the VFJTDB in order that a record of the job performance be kept. This step 628 will occur upon completion of the production run but could occur at any interim step. The PMC or other controller can use this data to account for the number of completed finished units, the amount of wasted sheets, time for production, and any other criteria that is desired to be monitored and recorded. Lastly, at step 629, the FMC automatically updates the VFJTDB concerning any new capability and constrain data relating to the devices. Such data may include reliability data, out-of-service data, new information regarding feeding constraints, etc. In sum, by breaking an assembler/finisher job into trackable job segments, the FMC enables the systematic control and integrity monitoring of offline assembler/finisher devices that until now have only minimally been digitally connected to each other or to devices such as printers.

An embodiment of key portions of software for the present invention will now be described. As described above in relation to the VFJTDB, each job may be comprised of an indeterminate number of document components and/or job segments. This indeterminate feature necessitates software algorithms that do not use predefined limits and boundaries, such as static memory buffers. Instead, the software algorithms recursively search the job model in the VFJTDB or other database based on a job key sequence. The job key sequence is provided from a data base record related to an individual job segment. By using a Microsoft Visual Basic 6.0 Predefined TreeView Component, the "Node Key" is constructed and stored using the job key sequence. This allows the user to select a node on the graphical display in the form of an icon and for the job sequence key to be retrieved in the form of the "Node Key". The data base job model can then be recursively searched to facilitate processing requirements.

The following software demonstrates the recursive algorithm used to build the graphical TreeView representation of the physical product being built. The Node Key is constructed as the sequence of parent node keys. Any time after the node icon is selected, the Node Key can be accessed and used to efficiently locate the Node in the over all job model. This subroutine builds the tree from the root down by recursively calling itself and stops at each branch of the tree when no more children exist. The advantages of using this algorithm are:
1. No predefined limits are defined for the number of levels existing in the job model tree;
2. The code size is compact;
3. The code uses existing built-in Microsoft Visual Basic Controls to provide the graphical presentation; and
4. The code retrieves the sequence key efficiently when processing a user selection event.

This software code is as follows:

```
Private Sub FillTree(Childid As String, Key As String, _
      nodeindex As Integer, nodx As Node, keys() As String, _
      level As Integer, nf As Form)
   'a recursive building of the job node tree
   Dim pd As NodeDef
   Dim pdkey As String
   NumChildren = GetChildren(Childid, pd)
   If (NumChildren > 0) Then
     For x = 1 To NumChildren
       pdkey = Key & "," & pd.NodeIds(x) & "," & Str$(nodeindex)
       nodeindex = nodeindex + 1
       Set nodx = nf.TreeView1.Nodes.Add(Key, tvwChild, pdkey, _
           pd.NodeIds(x) & " " & pd.Dscr(x))
       'Seems senseless but this makes entire Tree Visible
       nodx.Selected = True
       nodx.Selected = False
       If (keys(level) = pd.NodeIds(x)) Then nodx.Checked = True
       Call FillTree(pd.ChildIds(x), pdkey, nodeindex, nodx, keys,
           level + 1, nf)
     Next x
   End If
End Sub
```

Another algorithm of the FMC portion of the present invention presents a subroutine that recursively calls itself to check that all Nodes in the tree are in a required state. Every Node in the entire job model tree is checked until one is found not in the state. In this case, the finishing equipment is being checked to see if each bin is in the LOADED state. The function CheckSegments returns a TRUE or FALSE value. The actual purpose of this subroutine can be easily modified by simple substituting a new function in place of CheckSegments. This allows this code to be cloned and used for a number of purposes in the FMC.

The advantages of using this algorithm are:
1. No predefined limits are defined for the number of levels existing in the job model tree;
2. The code size is compact; and
3. The code is easy to clone and reuse for a number of FMC and related tasks.

An example of the software follows:

```
Private Sub JobRunTree(Childid As String, Abort As Boolean, _
      FormIdx As Integer, _
      JobIdStr As String, _
      nf As Treeview, _
      NodeIdx As Variant)
   'recursive traverse of the job node tree used buy Sub JobRun
   Dim pd As NodeDef
   Dim NumChildren As Integer
   If (Abort = False) Then
     NumChildren = GetChildren(Childid, pd)
     If (CheckSegments(FormIdx, JobIdStr, NumChildren, _
         nf.Nodes(NodeIdx).Key, NodeIdx)) Then
       Abort = True
```

-continued

```
     Else
       If (NumChildren > 0) Then
         For x = 1 To NumChildren
           Call JobRunTree(pd.ChildIds(x), Abort, FormIdx, JobIdStr, nf,
               NodeIdx)
         Next x
       End If
     End If
   End If
End Sub
```

Another aspect of the present invention is a software user interface and a "Document Construction Wizard" (DCW) software to assist the user in linking electronic image data files to particular document components and then to organize document components into documents. A user creates electronic image data files that represent the images that make up the document(s) that is desired to produce. The user chooses the final document form from one of the listed document form types. He/she then designates each image data file(s) as a specific document component of one of the seven document forms. The software enables, and the wizard assists, the user in designating document component orientations and ordination within the document form. It also uses a different set of rules for each document form to limit the number and type of document components from which a user can construct the document. For example, a signature booklet cannot have two separate sheets of media that are covers. It can only have one cover (a wrap around cover) but a tape bound document form may have up to two covers (front and back). In a similar manner, the DCW prompts the user for the required attributes that are dependant upon the selected document component type and/or document form. This software also reads a file or database that represents capabilities and constraints of the finishing equipment available to the user and thus would only display the finishing operations, options or attributes that are available based upon that finishing equipment that is available.

The DCW also prompts the user to enter whether or not the component is Variable Component. A Variable Component is a component whose image data will change from one copy of the document to the next copy of the document in the print job. A Static Component one whose image data will not change from one copy of the document to the next copy of the document in the print job. If the component is designated as Variable Component, the user would have to designate a form file name and a data file name. All of this data would be stored in a database.

The DCW allows the user to designate whether or not any document components are an External Components or whether all components are to be generated from an image data file. A External Component is one that is produced or printed through some other process but is not to be printed as part of this job. If designated as an External Component, then the DCW prompts the user for an integrity descriptor for the preprinted document component. The integrity descriptor is entered or read from a file if the user enters the integrity descriptor file name. All of this data is stored in a database.

In sum, what has been presented is a system for electronic management and control of a wide range of finishing processes characterized by input from multiple production operations and equipment that, depending upon the job, may be variably applied to work pieces that themselves are highly variable between different jobs. The present invention has been demonstrated in relation to printing and finishing operations for printed documents. The principles of the present invention, however, apply to such production and finishing systems as, without limitation, textile production (which may include printing, cutting, sewing, and finishing), packaging operations for various consumer and industrial products, and printed wiring board production, etc. The present invention is particularly applicable to many operations where processes for production of work pieces are managed separately from processes for finishing and packaging of such work pieces.

Among the advantages demonstrated are:

1) an integrated digital architecture for interactive control, tracking and integrity functions of all three phases of the prepress/printing/finishing process;

2) an integrated apparatus and method for enabling an operator, prior to printing of a job, to provide complete instructions for complex assembler/finishing operations, especially if off-line from the printer controller;

3) a method for accurately and completely describing the final document form of a complex document in a manner that enables both printer controllers and assembler/finisher controllers to instruct and control their respective printing and assembling/finishing operations;

4) an apparatus and method for dividing and managing a print job and associated work flow in response to constraints of both the available printing systems and the available finishing systems;

5) a queue management system that manages the entire print and finishing process in accordance with the availability of specified printers and of specified assembler/finisher equipment;

6) an interactive integrity check system capable of tracking each sheet through each production process, especially those portions of the process involving assembler/finisher operations that are offline from the printer controller; and 7) apparatus and method, acting in response to an interactive integrity check function, that automatically instructs printers to add or replace sheets not available to the assembler/finisher apparatus when such assembler/finisher apparatus calls for such sheets.

It is, therefore, evident that the present invention fully satisfies the aims and advantages set forth above. While the invention has been described in conjunction with several embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. In a finishing system having at least one finishing device controlled separately from production devices that produce workpieces of a job wherein such finishing device has capability and constraint attributes, a method for controlling finishing operations comprising:
   populating a virtual finishing job ticket database, the populating comprising:
   a) storing in the database a list of capability, temporary and permanent constraint attributes for each available finishing device;
   b) receiving finishing job description information, including descriptions of job segments of the job that are capable of being performed given the capability, temporary and permanent constraint attributes of the finishing device; and
   c) storing the finishing job description information in the database;
   directing finishing operations based on the populated virtual finishing job ticket database without operator intervention.

2. The method of claim 1, wherein the step of receiving finishing job description information comprises receiving a description of finishing operations for a job comprising printed sheet workpieces.

3. The method of claim 1, wherein the step of receiving finishing job description information comprises receiving such information from a production monitor controller.

4. The method of claim 3, wherein the step of receiving comprises receiving from the production monitor controller job model information comprising information associated with possible threads for production of the finishing job.

5. The method of claim 4, wherein the step of receiving job model information further comprises receiving build sequence information for production of the finishing job.

6. The method of claim 5, wherein the step of receiving build sequence information includes receiving information for programming operation of at least one finishing device to be used during the finishing job.

7. The method of claim 1, wherein the step of receiving comprises receiving reference pointers to locations where some specific job description information is stored.

8. The method of claim 1, further comprising arranging finishing job description information in a hierarchical manner.

9. The method of claim 8, wherein the step of arranging further comprises arranging in a hierarchical tree structure.

10. The method of claim 8, wherein the step of arranging in a hierarchical manner further comprises including, within at least one node at each level within the hierarchy of nodes, reference pointers to at least one node at a different level in the hierarchy such that all nodes of a job are referenced by at least one other node within the hierarchical arrangement of nodes.

11. The method of claim 8, wherein the step of arranging further comprises arranging a top level node comprising job identification data.

12. The method of claim 11, wherein the step of arranging a top level node further comprises including within the top level node reference pointers to at least one node at a hierarchical level below the top level.

13. The method of claim 8, further comprising including at least one node within a hierarchy of nodes in which one of a pre-designated list of document forms is identified as applying to a document to be finished during the finishing job.

14. The method of claim 13, further comprising using a reference pointer within at least one node to a list of attributes of the identified document form, which list is stored outside of the node itself.

15. The method of claim 8, wherein the step of storing further comprises storing information for different job segments in different nodes within a hierarchy of nodes.

16. The method of claim 8, wherein the step of storing further comprises storing information in a plurality of nodes at the same level within a hierarchy of nodes.

17. The method of claim 1, wherein the step of receiving further comprises receiving information associated with job segments produced by different production equipment and wherein the step of storing further comprises storing information describing such different job segments in different nodes of the virtual finishing job ticket database.

18. The method of claim 17, further comprising creating an information node within the virtual finishing job ticket database wherein descriptive information of a job segment is stored, such job segment comprising a combination of a plurality of job segments produced by different production equipment.

19. The method of claim 1, wherein the step of receiving further comprises receiving the finishing job description information from a production monitor controller.

20. The method of claim 1, further comprising providing access to the stored finishing job description information to a finishing module controller.

21. The method of claim 1, further comprising associating the stored finishing job descriptions information regarding at least one job segment identifier code such that stored information can be accessed through use of the job segment identifier code.

22. The method of claim 1, wherein the step of receiving further comprises receiving a digital copy of a virtual finishing job ticket.

23. The method of claim 1, wherein the step of storing capability and constraint attributes further comprises storing capability and constraint attributes for all finishing devices usable for the finishing job.

24. The method of claim 23, wherein the availability of a finishing device is one of the attributes stored in the virtual finishing job ticket database.

25. The method of claim 1, wherein the step of receiving comprises receiving data for controlling at least one finishing device.

26. The method of claim 1, wherein the step of receiving comprises receiving integrity data used after performance of the finishing device in order to confirm that the job was finished in accordance with the job description data.

27. A finishing system comprising:

at least one finishing device;

a production monitor controller; and, a virtual finishing job ticket database that includes:

a) job construction data;

b) control data used during automated instruction of the at least one finishing device; and c) integrity data used after performance of the finishing device in order to confirm that the job was finished in accordance with the control data.

28. The virtual finishing job ticket database of claim 27, wherein the job construction data, control data, and integrity data are stored in hierarchically arranged nodes of information.

29. The virtual finishing job ticket database of claim 27, further comprising a means for retrieving from the database an entire virtual finishing job ticket from information provided by a single job segment identifier.

* * * * *